(12) United States Patent
Chu et al.

(10) Patent No.: US 8,559,659 B2
(45) Date of Patent: Oct. 15, 2013

(54) CONTROL OF AUDIO OUTPUT STATE BASED ON WIRELESS CHARGING

(75) Inventors: Inchang Chu, Seoul (KR); Jaesung Lee, Gangwon-Do (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 13/250,160

(22) Filed: Sep. 30, 2011

(65) Prior Publication Data

US 2012/0294463 A1 Nov. 22, 2012

(30) Foreign Application Priority Data

May 19, 2011 (KR) .................. 10-2011-0047542

(51) Int. Cl.
*H04R 25/00* (2006.01)
*H02J 7/00* (2006.01)

(52) U.S. Cl.
USPC ......................................... 381/150; 320/114

(58) Field of Classification Search
USPC ............. 379/413, 433.08; 381/150, 365, 375, 381/388; 455/572–574; 320/114
See application file for complete search history.

(56) References Cited

U.S. PATENT DOCUMENTS

| | | | |
|---|---|---|---|
| 7,526,306 B2 * | 4/2009 | Brems et al. ................. | 455/518 |
| 7,772,802 B2 * | 8/2010 | Manico et al. ............... | 320/108 |
| 2010/0173672 A1 * | 7/2010 | Kuhl et al. ................... | 455/557 |
| 2010/0174629 A1 * | 7/2010 | Taylor et al. ................. | 705/34 |

OTHER PUBLICATIONS

"System Description Wireless Power Transfer", vol. 1: Low Power, Part 1: Interface Definition, Version 1.0, Wireless Power Consortium (Jul. 2010).

* cited by examiner

*Primary Examiner* — Brian Ensey
*Assistant Examiner* — Norman Yu
(74) *Attorney, Agent, or Firm* — Birch, Stewart, Kolasch & Birch, LLP

(57) ABSTRACT

According to the present disclosure, there is provided a wireless power receiver configured to provide a continuous phone call environment or content reproduction environment while at the same time conveniently performing wireless charging during the phone call or content reproduction by controlling to activate the operation of an audio output module provided in a wireless power receiver and change an output path of the audio signal when the wireless power receiver is detected. To this end, a wireless power receiver according to an embodiment disclosed herein can include an audio output module; a power receiving unit configured to receive a wireless power signal; and a control unit configured to detect a wireless power transmitter located in a charging region associated with the wireless power signal using the wireless power signal, and activate the operation of the audio output module when the wireless power transmitter is detected.

21 Claims, 19 Drawing Sheets

CONTROL OF AUDIO OUTPUT STATE BASED ON WIRELESS CHARGING

This application claims the benefit of Korean Patent Application No. 10-2011-0047542, filed on May 19, 2011, which is hereby incorporated by reference for all purposes as if fully set forth herein.

BACKGROUND OF THE INVENTION

1. Field of the Invention

The present disclosure relates to a wireless power transmitter and wireless power receiver, and more particularly, to a wireless power transmitter and wireless power receiver for controlling an audio output state of the wireless power receiver in a wireless charging environment.

2. Description of the Related Art

As portability is emphasized in the user's various electronic devices, the efficiency of a battery becomes more important. Accordingly, various technologies for making a highly effective battery have been proposed. Though there have been attempts to make a highly effective battery, no great advance has been made in battery charging.

In particular, power adaptors should be provided individually to charge each electronic device, thereby imposing burdensome labor to the user. In recent years, many studies for charging an electronic device in a wireless manner have been carried out. The wireless charging is an advanced energy transfer concept capable of removing wires for charging, and transferring energy in an electromagnetic manner.

SUMMARY OF THE INVENTION

An aspect of the present disclosure is to provide a wireless power receiver configured to provide a continuous phone call environment or content reproduction environment while at the same time conveniently performing wireless charging during the phone call or content reproduction by activating the operation of an audio output module to change an output path of the audio signal when a wireless power transmitter is detected.

Furthermore, another aspect of the present disclosure is to provide a wireless power receiver configured to provide a continuous phone call environment or content reproduction environment while at the same time conveniently performing wireless charging during the phone call or content reproduction by controlling to activate the operation of an audio output module provided in a wireless power receiver and change an output path of the audio signal when the wireless power receiver is detected.

In order to accomplish the foregoing tasks, a wireless power receiver according to an embodiment disclosed herein can include a first audio output module; a power receiving unit configured to receive a wireless power signal; and a control unit configured to detect a wireless power transmitter located in a charging region associated with the wireless power signal using the wireless power signal, and activate the operation of the first audio output module when the wireless power transmitter is detected.

According to an embodiment, the wireless power receiver can further include a second audio output module, wherein the control unit deactivates the operation of the second audio output module when the operation of the first audio output module is activated.

Furthermore, according to an embodiment, the first audio output module can be a speakerphone speaker, and the second audio output module can be a handset speaker.

Furthermore, according to an embodiment, the control unit can switch the operation mode of the wireless power receiver from a handset mode to a speakerphone mode when the wireless power transmitter is detected.

Furthermore, according to an embodiment, the wireless power receiver can further include an interface unit configured to transmit an audio signal to an audio output device connected thereto, wherein the control unit suspends a transmission of the audio signal when the operation of the first audio output module is activated.

Furthermore, according to an embodiment, the audio output device can be a headphone in a wired or wireless manner.

Furthermore, according to an embodiment, the control unit can switch the operation mode of the wireless power receiver from a headphone mode to a speaker mode when the wireless power transmitter is detected.

Furthermore, according to an embodiment, the control unit can deactivate the operation of the first audio output module when the wireless power transmitter is not detected.

Furthermore, according to an embodiment, the control unit can switch the operation mode of the wireless power receiver from a speakerphone mode to a handset mode when the wireless power transmitter is not detected.

Furthermore, according to an embodiment, the control unit can switch the operation mode of the wireless power receiver from a speaker mode to a headphone mode when the wireless power transmitter is not detected.

Furthermore, according to an embodiment, the power receiving unit can detect the wireless power transmitter based on a strength of the wireless power signal.

Furthermore, according to an embodiment, the power receiving unit can receive power in a wireless manner from the wireless power transmitter when the wireless power transmitter is detected.

Furthermore, according to an embodiment, the wireless power receiver can further include a display unit configured to output a menu for activating the operation of the first audio output module; and an input unit configured to receive an input for selecting a menu to activate the operation of the first audio output module, wherein the control unit activates the operation of the first audio output module upon receiving the input.

Furthermore, according to an embodiment, the wireless power receiver can further include an output configured to output an indicator indicating an active state of the operation of the first audio output module.

In order to accomplish the foregoing tasks, a wireless power transmitter according to an embodiment disclosed herein can include a power transmitting unit configured to form a wireless power signal using power supplied from a power supply unit; and a control unit configured to detect a wireless power receiver located in a charging region associated with the wireless power signal, and generate a first control signal for activating the operation of the audio output module provided in the detected wireless power receiver when the wireless power receiver is detected, and transmit the generated first control signal to the detected wireless power receiver.

Furthermore, according to an embodiment, the first control signal can be a control signal for switching the operation mode of the wireless power receiver from a handset mode to a speakerphone mode.

Furthermore, according to an embodiment, the first control signal can be a control signal for switching the operation mode of the wireless power receiver from a headphone mode to a speaker mode.

Furthermore, according to an embodiment, the control unit can generate a second control signal for deactivating the operation of an audio output module provided in the detected wireless power receiver, and transmit the generated second control signal to the detected wireless power receiver when the detected wireless power receiver is not detected.

Furthermore, according to an embodiment, the second control signal can be a control signal for switching the operation mode of the wireless power receiver from a speakerphone mode to a handset mode.

Furthermore, according to an embodiment, the second control signal can be a control signal for switching the operation mode of the wireless power receiver from a speaker mode to a headphone mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
FIG. 1 is a view conceptually illustrating a wireless power transmitter and an electronic device according to the embodiments of the present invention.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly.

Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element can be named to a second element, and similarly, a second element can be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

FIG. 1 is a view conceptually illustrating a wireless power transmitter and an electronic device according to the embodiments of the present invention.

Referring to FIG. 1, the wireless power transmitter 100 can be a power transfer apparatus configured to transfer power used for the electronic device 200 in a wireless manner. Furthermore, the wireless power transmitter 100 can be a wireless charging apparatus configured to charge a battery of the electronic device 200 by transferring power in a wireless manner. The wireless power transmitter 100 being a wireless charging apparatus will be described later with reference to FIG. 9. Additionally, the wireless power transmitter 100 can be implemented with various forms of apparatuses transferring power to the electronic device 200 requiring power in a contactless state.

The electronic device 200 is a device that is operable by receiving power from the wireless power transmitter 100 in a wireless manner. Furthermore, the electronic device 200 can charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like. The electronic device 200, as described later, can be a mobile communication terminal, (for example, a portable phone, a cellular phone, and a tablet or multimedia device). The electronic a mobile terminal device will be described later with reference to FIG. 10.

On the other hand, the wireless power transmitter 100 can transfer power in a wireless manner without mutual contact to the electronic device 200 using one or more wireless power transfer methods. In other words, the wireless power transmitter 100 can transfer power using at least one of an inductive coupling method based on magnetic induction phenomenon by the wireless power signal and a magnetic resonance coupling method based on electromagnetic resonance phenomenon by a wireless power signal at a specific frequency.

Contactless power transfer in the inductive coupling method is a technology transmitting power in a wireless manner using a primary coil and a secondary coil, and refers to the transmission of power by inducing a current from a coil to another coil through a changing magnetic field by magnetic induction phenomenon.

Contactless power transfer in the inductive coupling method refers to a technology in which the electronic device 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and electronic device 200 according to the embodiments disclosed herein will be described in detail. In assigning reference numerals to the constituent elements in each of the following drawings, the same reference numerals will be used for the same constituent elements even though they are shown in a different drawing.

Figure 2A:
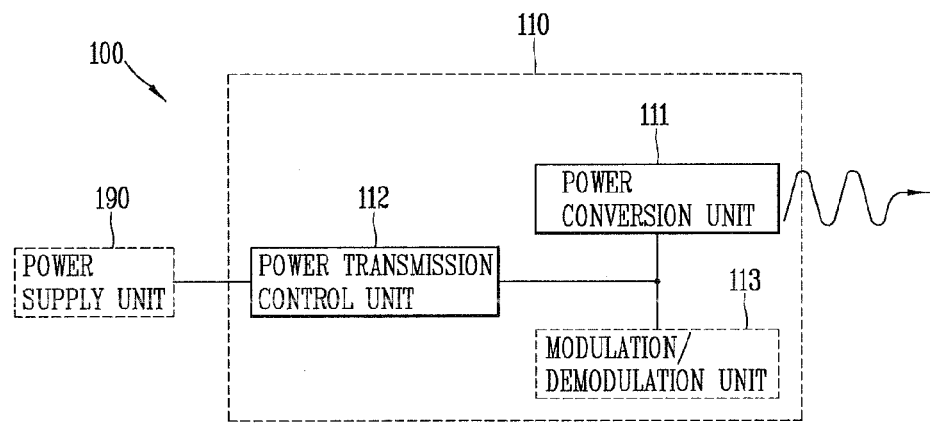
FIGS. 2A and 2B are block diagrams illustrating the configuration of a wireless power transmitter and an electronic device that can be employed in the embodiments disclosed herein, respectively.
Figure 2B:
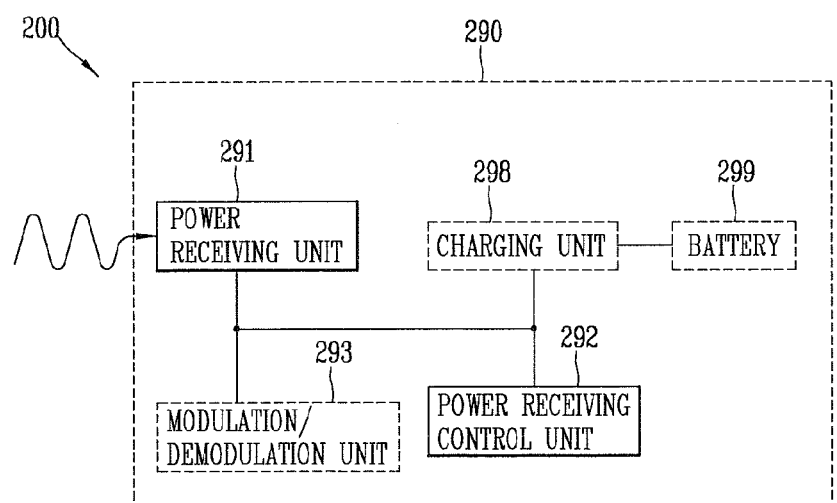

FIGS. 2A and 2B are block diagrams illustrating the configuration of a wireless power transmitter 100 and an electronic device 200 that can be employed in the embodiments disclosed herein.

Referring to FIG. 2A, the wireless power transmitter 100 can include a power transmission unit 110. The power transmission unit 110 can include a power conversion unit 111 and a power transmission control unit 112.

The power conversion unit 111 transfers power supplied from the transmission side power supply unit 190 to the electronic device 200 by converting it into a wireless power signal. The wireless power signal transferred by the power conversion unit 111 is generated in the form of a magnetic field or electro-magnetic field having an oscillation characteristic. For this purpose, the power conversion unit 111 can be configured to include a coil for generating the wireless power signal.

The power conversion unit 111 can include a constituent element for generating a different type of wireless power signal according to each power transfer method. For example, the power conversion unit 111 can include a primary coil for forming a changing magnetic field to induce a current to a secondary coil of the electronic device 200. Furthermore, the power conversion unit 111 can include a coil (or antenna) for forming a magnetic field having a specific resonance frequency to generate a resonance frequency in the electronic device 200 according to the resonance coupling method.

Furthermore, the power conversion unit 111 can transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7A, 7B, and 8.

On the other hand, the power conversion unit 111 can further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 can be implemented to be integrated into another control unit (not shown) for controlling the wireless power transmitter 100.

On the other hand, a region to which the wireless power signal can be approached can be divided into two types. First, active area denotes a region through which a wireless power signal transferring power to the electronic device 200 is passed. Next, semi-active area denotes a region of interest in which the wireless power transmitter 100 can detect the existence of the electronic device 200. The semi-active area may also be called as semi-charging area, considering the case where the wireless power transmitter 100 is transferring a power to the electronic device 200 for charging.

Here, the power transmission control unit 112 can detect whether the electronic device 200 is placed in the active area or semi-active area or removed from the area. Specifically, the power transmission control unit 112 can detect whether or not the electronic device 200 is placed in the active area or semi-active area using a wireless power signal formed from the power conversion unit 111 or a sensor separately provided therein.

For instance, the power transmission control unit 112 can detect the presence of the electronic device 200 by monitoring whether or not the characteristic of power for forming the wireless power signal is changed by the wireless power signal, which is affected by the electronic device 200 existing in the semi-active area. However, the active area and semi-active area can vary according to the wireless power transfer method such as an inductive coupling method, a resonance coupling method, and the like. For example, the wireless power transmitter 100 can interact with the electronic device 200 placed in the semi-active area, performing various process such as an analog ping, a digital ping, and an identification/configuration process, which will be described in other part of this document.

The power transmission control unit 112 can perform the process of identifying the electronic device 200 or determine whether to start contactless power transfer according to a result of detecting the existence of the electronic device 200.

Furthermore, the power transmission control unit 112 can determine at least one characteristic of a frequency, a voltage, and a current of the power conversion unit 111 for forming the wireless power signal. The determination of the characteristic can be carried out by a condition at the side of the wireless power transmitter 100 or a condition at the side of the electronic device 200.

The power transmission control unit 112 can receive a power control message from the electronic device 200. The power transmission control unit 112 can determine at least one characteristic of a frequency, a voltage and a current of the power conversion unit 111 based on the received power control message, and additionally perform other control operations based on the power control message.

For example, the power transmission control unit 112 can determine at least one characteristic of a frequency, a voltage and a current used to form the wireless power signal according to the power control message including at least one of rectified power amount information, charging state information and identification information in the electronic device 200.

Furthermore, as another control operation using the power control message, the wireless power transmitter 100 can perform a typical control operation associated with contactless power transfer based on the power control message. For example, the signal detector 10 can receive information associated with the electronic device 200 to be auditorily or visually output through the power control message, or receive information used for authentication between devices.

In order to receive the foregoing power control message, the power transmission control unit 112 can use at least one of a method for receiving it through the wireless power signal and a method for receiving other user data.

In order to receive the foregoing power control message, the wireless power transmitter 100 can further include a power communications modulation/demodulation unit 113 electrically connected to the power conversion unit 111. The power communications modulation/demodulation unit 113 can modulate a wireless power signal that has been modulated by the electronic device 200 and use it to receive the power control message. The method for allowing the power conversion unit 111 to receive a power control message using a wireless power signal will be described later with reference to FIGS. 11A through 15.

In addition, the power transmission control unit 112 can acquire a power control message by receiving user data including a power control message by a communication means (not shown) included in the wireless power transmitter 100.

Referring to FIG. 2B, the electronic device 200 can include a power supply unit 290. The power supply unit 290 supplies power used for the operation of the electronic device 200. The power supply unit 290 can include a power receiving unit 291 and a power receiving control unit 292.

The power receiving unit 291 receives power transferred from the wireless power transmitter 100 in a wireless manner. The power receiving unit 291 can include constituent elements used to receive the wireless power signal according to a wireless power transfer method. Furthermore, the power receiving unit 291 can receive power according to at least one wireless power transfer method, and the power receiving unit 291 can include constituent elements used for each method.

First, the power receiving unit 291 can include a coil for receiving a wireless power signal transferred in the form of a magnetic field or electromagnetic field having a vibration characteristic. For instance, as a constituent element according to the inductive coupling method, the power receiving unit 291 can include a secondary coil to which a current is induced by a changing magnetic field. Furthermore, the power receiving unit 291, as a constituent element according to the resonance coupling method, can include a coil and a resonant circuit in which resonance phenomenon is generated by a magnetic field having a specific resonance frequency.

However, when the power receiving unit 291 receives power according to at least one wireless power transfer method, the power receiving unit 291 can be implemented to receive power by using a coil, or implemented to receive power by using a coil formed differently according to each power transfer method. Among the constituent elements included in the power receiving unit 291, those for the inductive coupling method will be described later with reference to FIG. 4, and those for the resonance coupling method with reference to FIGS. 7A and 7B.

On the other hand, the power receiving unit 291 can further include a rectifier and a regulator to convert the wireless power signal into a direct current. Furthermore, the power receiving unit 291 can further include a circuit for protecting an overvoltage or overcurrent from being generated by the received power signal.

The power receiving control unit 292 can control each constituent element included in the power supply unit 290. Specifically, the power receiving control unit 292 can transfer a power control message to the wireless power transmitter 100. The power control message can instruct the wireless power transmitter 100 to initiate or terminate a transfer of the wireless power signal. Furthermore, the power control message can instruct the wireless power transmitter 100 to control a characteristic of the wireless power signal.

In order to transmit the foregoing power control message, the power receiving control unit 292 can use at least one of a method for transmitting it through the wireless power signal and a method for transmitting other user data.

In order to transmit the foregoing power control message, the electronic device 200 can further include a power communications modulation/demodulation unit 293 electrically connected to the power receiving unit 291. The power communications modulation/demodulation unit 293, like the wireless power transmitter 100, can be used to transmit the power control message through the wireless power signal.

The power communications modulation/demodulation unit 293 can be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the electronic device 200, respectively, to be used to transmit and receive a power control message through a wireless power signal will be described.

A wireless power signal formed by the power conversion unit 111 is received by the power receiving unit 291. At this time, the power receiving control unit 292 controls the power communications modulation/demodulation unit 293 at the side of the electronic device 200 to modulate the wireless power signal. For instance, the power receiving control unit 292 can perform a modulation process such that a power amount received from the wireless power signal is varied by changing a reactance of the power communications modulation/demodulation unit 293 connected to the power receiving unit 291.

The change of a power amount received from the wireless power signal results in the change of a current and/or voltage of the power conversion unit 111 for forming the wireless power signal. At this time, the modulation/demodulation unit 113 at the side of the wireless power transmitter 100 can detect a change of the current and/or voltage to perform a demodulation process.

In other words, the power receiving control unit 292 can generate a packet including a power control message intended to be transferred to the wireless power transmitter 100 and modulate the wireless power signal to allow the packet to be included therein, and the power transmission control unit 112 can decode the packet based on a result of performing the demodulation process of the power communications modulation/demodulation unit 113 to acquire the power control message included in the packet. The detailed method of allowing the wireless power transmitter 100 to acquire the power control message will be described later with reference to FIGS. 10 through 13.

In addition, the power receiving control unit 292 can transmit a power control message to the wireless power transmitter 100 by transmitting user data including the power control message by a communication means (not shown) included in the electronic device 200.

In addition, the power supply unit 290 can further include a charger 298 and a battery 299.

The electronic device 200 receiving power for operation from the power supply unit 290 can be operated by power transferred from the wireless power transmitter 100, or operated by charging the battery 299 using the transferred power and then receiving the charged power. At this time, the power receiving control unit 292 can control to perform charging using the transferred power.

Hereinafter, a wireless power transmitter and an electronic device applicable to the embodiments disclosed herein will be described. First, a method of allowing the wireless power transmitter to transfer power to the electronic device according to the inductive coupling method will be described with reference to FIGS. 3 through 5.

Figure 3:
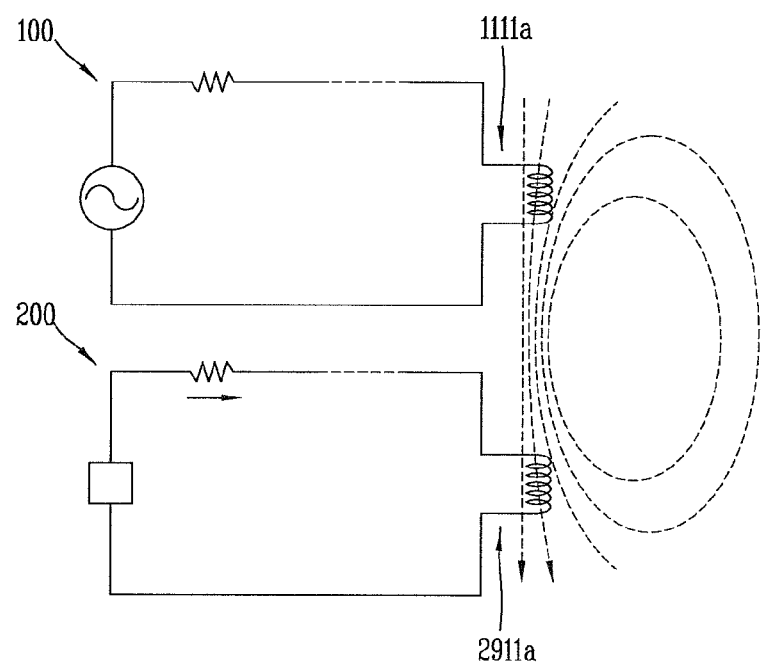
FIG. 3 is a view illustrating a concept in which power is transferred from a wireless power transmitter to an electronic device in a wireless manner according to an inductive coupling method in accordance with an embodiment of the present invention.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the electronic device 200.

According to the foregoing method, the power conversion unit 111 of the wireless power transmitter 100 can include a transmitting (Tx) coil 1111a being operated as a primary coil in magnetic induction. Furthermore, the power receiving unit 291 of the electronic device 200 can include a receiving (Rx) coil 2911a being operated as a secondary coil in magnetic induction.

First, the wireless power transmitter 100 and electronic device 200 are disposed in such a manner that the transmitting coil 1111a at the side of the wireless power transmitter 100 and the receiving coil at the side of the electronic device 200 are located adjacent to each other. Then, if the power transmission control unit 112 controls a current of the transmitting coil 1111a to be changed, then the power receiving unit 291 controls power to be supplied to the electronic device 200 using an electromotive force induced to the receiving coil 2911a.

The efficiency of contactless power transfer by the inductive coupling method can be little affected by a frequency characteristic, but affected by an alignment and distance between the wireless power transmitter 100 and the electronic device 200 including each coil.

On the other hand, in order to perform contactless power transfer in the inductive coupling method, the wireless power transmitter 100 can be configured to include an interface surface (not shown) in the form of a flat surface. One or more electronic devices can be placed at an upper portion of the interface surface, and the transmitting coil 1111a can be mounted at a lower portion of the interface surface.

A vertical spacing is formed in a small-scale between the transmitting coil 1111a mounted at a lower portion of the interface surface and the receiving coil 2911a of the electronic device 200 placed at an upper portion of the interface surface, and thus a distance between the coils becomes sufficiently small to efficiently implement contactless power transfer by the inductive coupling method.

Furthermore, an alignment indicator (not shown) indicating a location where the electronic device 200 is to be placed at an upper portion of the interface surface. The alignment indicator indicates a location of the electronic device 200 where an alignment between the transmitting coil 1111a mounted at a lower portion of the interface surface and the receiving coil 2911a can be suitably implemented.

The alignment indicator can be simple marks, or can be formed in the form of a protrusion structure for guiding the location of the electronic device 200. Otherwise, the alignment indicator can be formed in the form of a magnetic body such as a magnet mounted at a lower portion of the interface surface, thereby guiding the coils to be suitably arranged by mutual magnetism to a magnetic body having an opposite polarity mounted within the electronic device 200.

On the other hand, the wireless power transmitter 100 can be formed to include one or more transmitting coils. The wireless power transmitter 100 can selectively use some of coils suitably arranged with the receiving coil 2911a of the electronic device 200 among the one or more transmitting coils to enhance the power transmission efficiency. The wireless power transmitter 100 including the one or more transmitting coils will be described later with reference to FIG. 5.

Hereinafter, a configuration of the wireless power transmitter and electronic device using an inductive coupling method applicable to the embodiments disclosed herein will be described in detail.

Figure 4A:
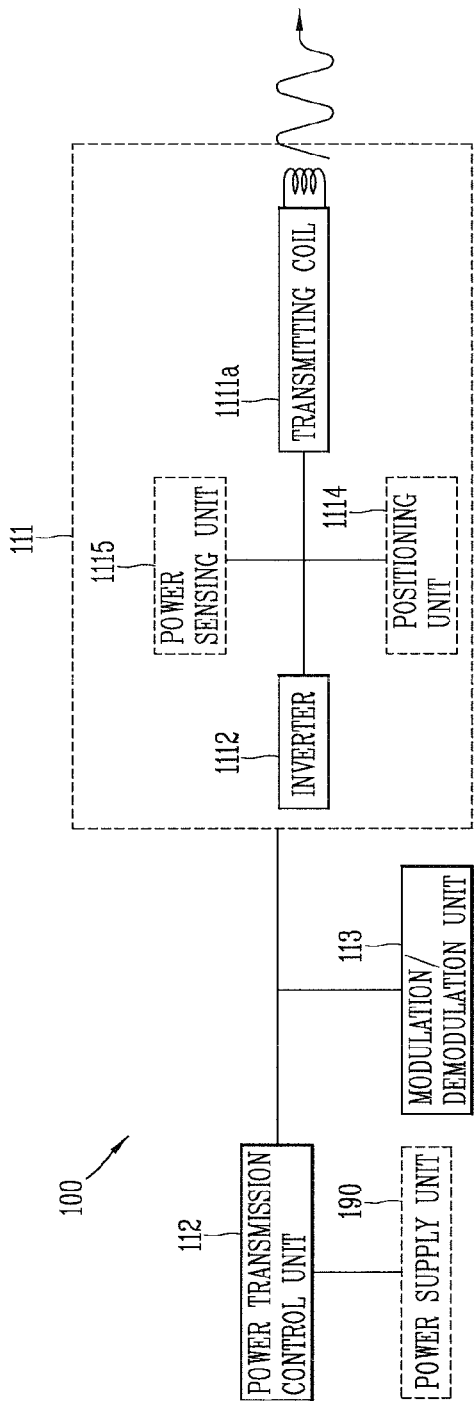
FIGS. 4A and 4B are block diagrams illustrating part of the wireless power transmitter and electronic device in a magnetic induction method that can be employed in the embodiments disclosed herein.
Figure 4B:
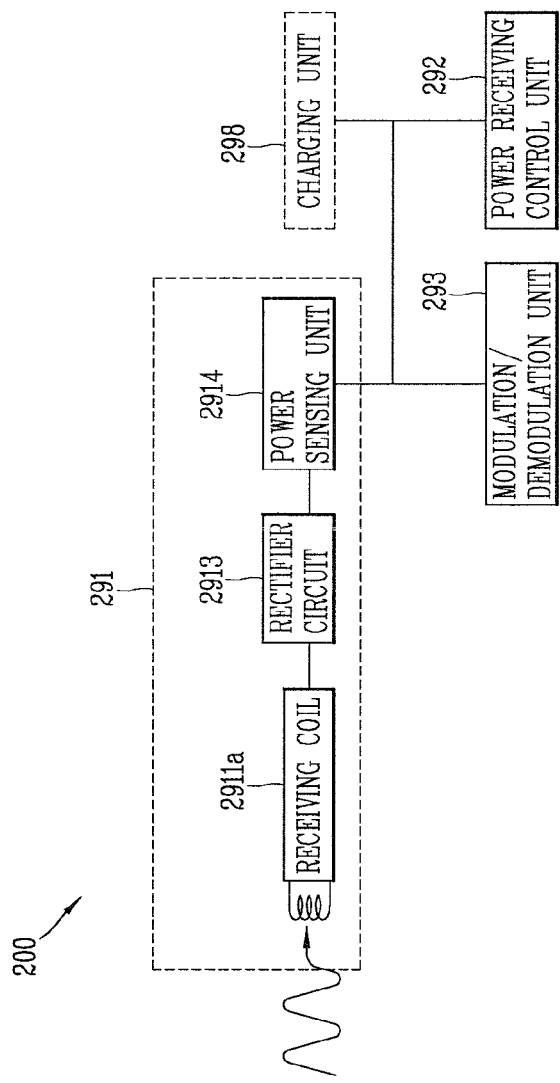

FIG. 4 is a block diagram illustrating part of the wireless power transmitter 100 and electronic device 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the electronic device 200 will be described with reference to FIG. 4B.

Referring to FIG. 4A, the power conversion unit 111 of the wireless power transmitter 100 can include a transmitting (Tx) coil 1111a and an inverter 1112.

The transmitting coil 1111a can form a magnetic field corresponding to the wireless power signal according to a change of current as described above. The transmitting coil 1111a can be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 can further include a positioning unit 1114.

The positioning unit 1114 can move or rotate the transmitting coil 1111a to enhance the effectiveness of contactless power transfer using the inductive coupling method. As described above, it is because an alignment and distance between the wireless power transmitter 100 and the electronic device 200 including a primary coil and a secondary coil can affect power transfer using the inductive coupling method. In particular, the positioning unit 1114 can be used when the electronic device 200 does not exist within an active area of the wireless power transmitter 100.

Accordingly, the positioning unit 1114 can include a drive unit (not shown) for moving the transmitting coil 1111a such that a center-to-center distance of the transmitting coil 1111a of the wireless power transmitter 100 and the receiving coil 2911a of the electronic device 200 is within a predetermined range, or rotating the transmitting coil 1111a such that the centers of the transmitting coil 1111a and the receiving coil 2911a are overlapped with each other.

For this purpose, the wireless power transmitter 100 can further include a detection unit (not shown) made of a sensor for detecting the location of the electronic device 200, and the power transmission control unit 112 can control the positioning unit 1114 based on the location information of the electronic device 200 received from the location detection sensor.

Furthermore, to this end, the power transmission control unit 112 can receive control information on an alignment or distance to the electronic device 200 through the power communications modulation/demodulation unit 113, and control the positioning unit 1114 based on the received control information on the alignment or distance.

If the power conversion unit 111 is configured to include a plurality of transmitting coils, then the positioning unit 1114 can determine which one of the plurality of transmitting coils is to be used for power transfer. The configuration of the wireless power transmitter 100 including the plurality of transmitting coils will be described later with reference to FIG. 5.

On the other hand, the power conversion unit 111 can further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 can detect a voltage or current of the power supplied from the outside, and check whether the detected voltage or current exceeds a threshold value.

The power sensing unit 1115, though not shown in the drawing, can include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 can control a switching unit (not shown) to cut off power applied to the transmitting coil 1111a.

Referring to FIG. 4B, the power supply unit 290 of the electronic device 200 can include a receiving (Rx) coil 2911a and a rectifier circuit 2913.

A current is induced into the receiving coil 2911a by a change of the magnetic field formed in the transmitting coil 1111a. The implementation type of the receiving coil 2911a can be a planar spiral type or cylindrical solenoid type similarly to the transmitting coil 1111a.

Furthermore, series and parallel capacitors can be configured to be connected to the receiving coil 2911a to enhance the effectiveness of wireless power reception or perform resonant detection.

The receiving coil 2911a can be in the form of a single coil or a plurality of coils.

The rectifier circuit 2913 performs a full-wave rectification to a current to convert alternating current into direct current. The rectifier circuit 2913, for instance, can be implemented with a full-bridge rectifier circuit made of four diodes or a circuit using active components.

In addition, the rectifier circuit 2913 can further include a regulator circuit for converting a rectified current into a more flat and stable direct current. Furthermore, the output power of the rectifier circuit 2913 is supplied to each constituent element of the power supply unit 290. Furthermore, the rectifier circuit 2913 can further include a DC-DC converter for converting output DC power into a suitable voltage to adjust it to the power used for each constituent element (for instance, a circuit such as a charger 298).

The power communications modulation/demodulation unit 293 can be connected to the power receiving unit 291, and can be configured with a resistive element in which resistance varies with respect to direct current, and can be configured with a capacitive element in which reactance varies with respect to alternating current. The power receiving control unit 292 can change the resistance or reactance of the power communications modulation/demodulation unit 293 to modulate a wireless power signal received to the power receiving unit 291.

On the other hand, the power supply unit 290 can further include a power sensing unit 2914. The power sensing unit 2914 at the side of the electronic device 200 monitors a voltage and/or current of the power rectified by the rectifier circuit 2913, and if the voltage and/or current of the rectified power exceeds a threshold value as a result of monitoring, then the power receiving control unit 292 transmits a power control message to the wireless power transmitter 100 to transfer suitable power.

Figure 5:
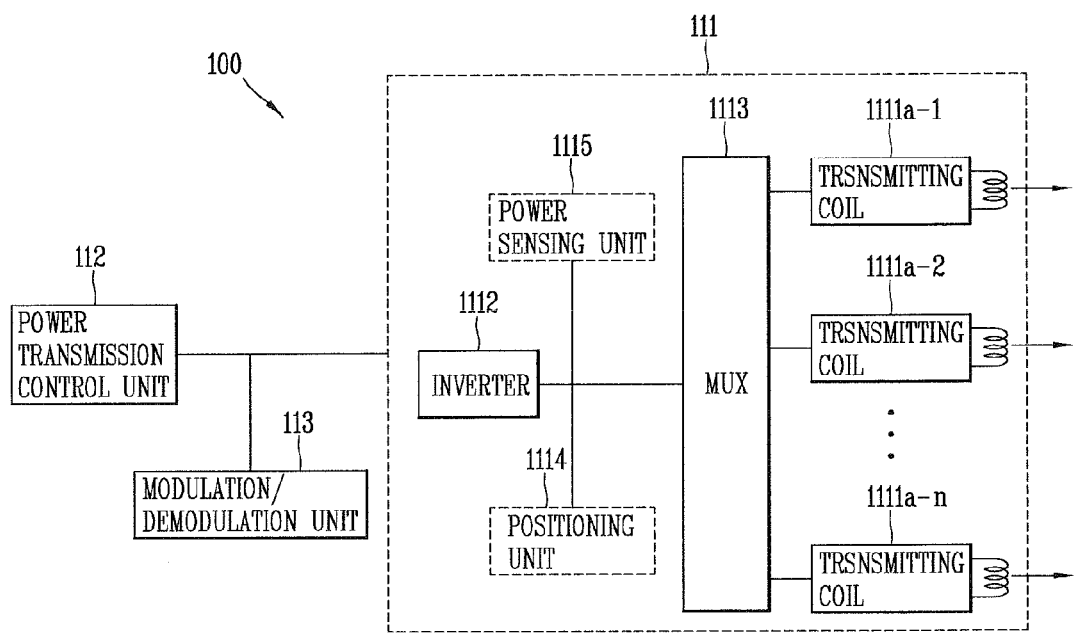
FIG. 5 is a block diagram illustrating a wireless power transmitter configured to have one or more transmission coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein can include one or more transmitting coils 1111*a*-1 to 1111*a-n*. The one or more transmitting coils 1111*a*-1 to 1111*a-n* can be an array of partly overlapping primary coils. An active area can be determined by some of the one or more transmitting coils.

The one or more transmitting coils 1111*a*-1 to 1111*a-n* can be mounted at a lower portion of the interface surface. Furthermore, the power conversion unit 111 can further include a multiplexer 1113 for establishing and releasing the connection of some of the one or more transmitting coils 1111*a*-1 to 1111*a-n*.

Upon detecting the location of the electronic device 200 placed at an upper portion of the interface surface, the power transmission control unit 112 can take the detected location of the electronic device 200 into consideration to control the multiplexer 1113, thereby allowing coils that can be placed in an inductive coupling relation to the receiving coil 2911*a* of the electronic device 200 among the one or more transmitting coils 1111*a*-1 to 1111*a-n* to be connected to one another.

For this purpose, the power transmission control unit 112 can acquire the location information of the electronic device 200. For example, the power transmission control unit 112 can acquire the location of the electronic device 200 on the interface surface by the location detection unit (not shown) provided in the wireless power transmitter 100.

For another example, the power transmission control unit 112 can receive a power control message indicating a strength of the wireless power signal from an object on the interface surface or a power control message indicating the identification information of the object using the one or more transmitting coils 1111*a*-1 to 1111*a-n*, respectively, and determines whether it is located adjacent to which one of the one or more transmitting coils based on the received result, thereby acquiring the location information of the electronic device 200.

On the other hand, the active area as part of the interface surface can denote a portion through which a magnetic field with a high efficiency can pass when the wireless power transmitter 100 transfers power to the electronic device 200 in a wireless manner. At this time, a single transmitting coil or one or a combination of more transmitting coils forming a magnetic field passing through the active area can be designated as a primary cell.

Accordingly, the power transmission control unit 112 can determine an active area based on the detected location of the electronic device 200, and establish the connection of a primary cell corresponding to the active area to control the multiplexer 1113, thereby allowing the receiving coil 2911*a* of the electronic device 200 and the coils belonging to the primary cell to be placed in an inductive coupling relation.

Furthermore, the power conversion unit 111 can further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Figure 6:
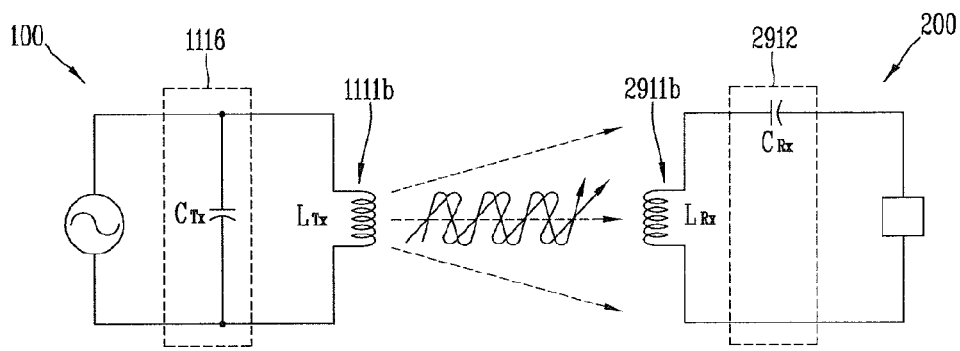
FIG. 6 is a view illustrating a concept in which power is transferred to an electronic device from a wireless power transmitter in a wireless manner according to an resonance coupling method in accordance with an embodiment of the present invention.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which an amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the electronic device 200 by the formed magnetic field, then power is generated by the resonance phenomenon in the electronic device 200.

The resonance frequency can be determined by the following formula in Equation 1.

$$f = \frac{1}{2\pi\sqrt{LC}} \quad \text{[Equation 1]}$$

Here, the resonance frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit can be configured to be connected thereto to determine the resonance frequency.

Referring to FIG. 6, when power is transmitted in a wireless manner according to the resonance coupling method, the power conversion unit 111 of the wireless power transmitter 100 can include a transmitting (Tx) coil 1111*b* in which a magnetic field is formed and a resonant circuit 1116 connected to the transmitting coil 1111*b* to determine a specific vibration frequency. The resonant circuit 1116 can be implemented by using a capacitive circuit (capacitors), and the specific vibration frequency can be determined based on an inductance of the transmitting coil 1111*b* and a capacitance of the resonant circuit 1116.

The configuration of a circuit element of the resonant circuit 1116 can be implemented in various forms such that the power conversion unit 111 forms a magnetic field, and is not limited to a form of being connected in parallel to the transmitting coil 1111*b* as illustrated in FIG. 6.

Furthermore, the power receiving unit 291 of the electronic device 200 can include a resonant circuit 2912 and a receiving (Rx) coil 2911*b* to generate a resonance phenomenon by a magnetic field formed in the wireless power transmitter 100. In other words, the resonant circuit 2912 can be also implemented by using a capacitive circuit, and the resonant circuit 2912 is configured such that a resonance frequency determined based on an inductance of the receiving coil 2911b and a capacitance of the resonant circuit 2912 has the same frequency as a resonance frequency of the formed magnetic field.

The configuration of a circuit element of the resonant circuit 2912 can be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 can have $L_{TX}$, $C_{TX}$, and can be acquired by using the Equation 1. Here, the electronic device 200 generates resonance when a result of substituting the $L_{RX}$ and $C_{RX}$ of the electronic device 200 to the Equation 1 is same as the specific vibration frequency.

According to a contactless power transfer method by resonance coupling, when the wireless power transmitter 100 and electronic device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the electronic device 200 including each coil is relatively smaller than the inductive coupling method.

Hereinafter, the configuration of a wireless power transmitter and an electronic device in the resonance coupling method applicable to the embodiments disclosed herein will be described in detail.

Figure 7A:
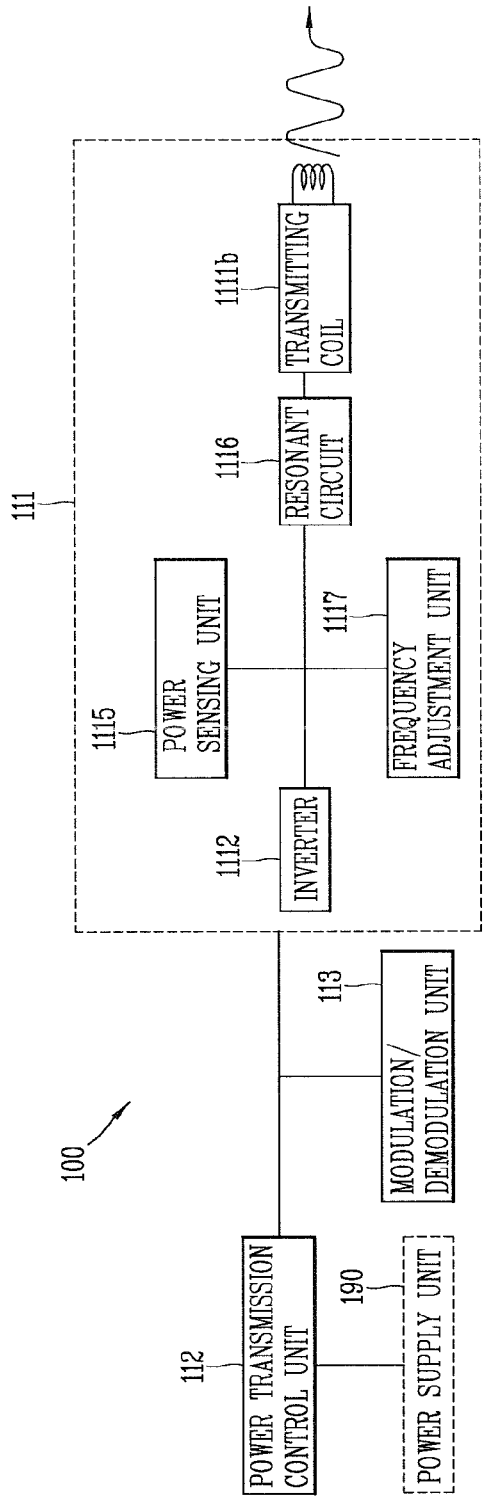
FIGS. 7A and 7B are block diagrams illustrating part of the wireless power transmitter and electronic device in a resonance method that can be employed in the embodiments disclosed herein.
Figure 7B:
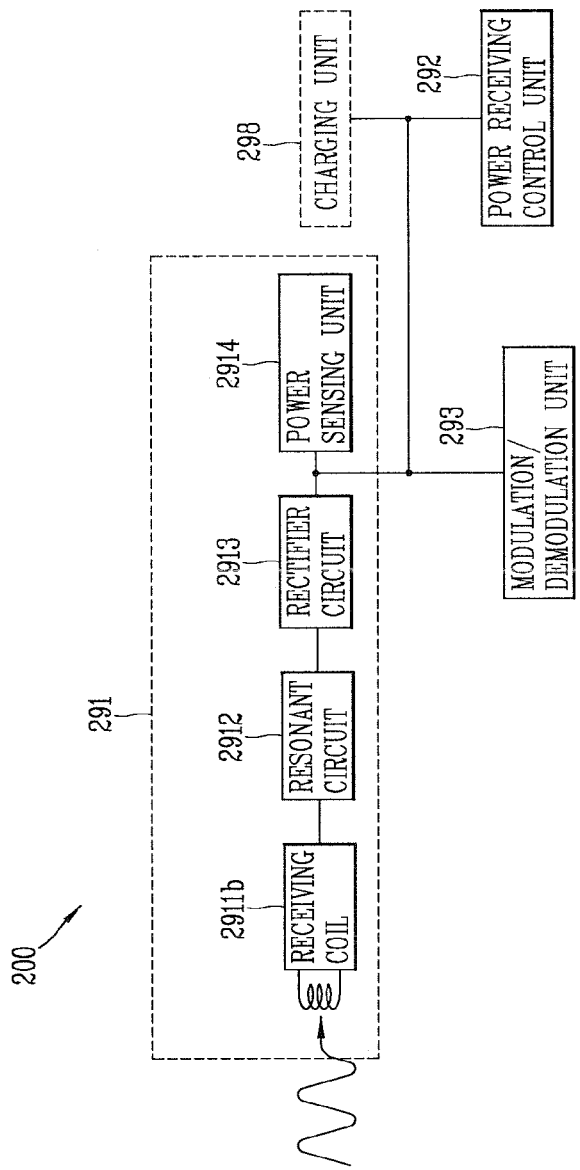

FIGS. 7A and 7B are block diagrams illustrating part of the wireless power transmitter 100 and electronic device 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 can include a transmitting (Tx) coil 1111b, an inverter 1112, and a resonant circuit 1116. The inverter 1112 can be configured to be connected to the transmitting coil 1111b and the resonant circuit 1116.

The transmitting coil 1111b can be mounted separately from the transmitting coil 1111a for transferring power according to the inductive coupling method, but can transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency can be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 can further include a frequency adjustment unit 1117 for changing a resonance frequency of the power conversion unit 111. The resonance frequency of the power conversion unit 111 is determined based on an inductance and/or capacitance within a circuit constituting the power conversion unit 111 by Equation 1, and thus the power transmission control unit 112 can determine the resonance frequency of the power conversion unit 111 by controlling the frequency adjustment unit 1117 to change the inductance and/or capacitance.

The frequency adjustment unit 1117, for example, can be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 can further include a power sensing unit 1115. The operation of the power sensing unit 1115 is the same as the foregoing description.

Referring to FIG. 7B, a configuration of the power supply unit 290 included in the electronic device 200 will be described. The power supply unit 290, as described above, can include the receiving (Rx) coil 2911b and resonant circuit 2912.

In addition, the power receiving unit 291 of the power supply unit 290 can further include a rectifier circuit 2913 for converting an AC current generated by resonance phenomenon into DC. The rectifier circuit 2913 can be configured similarly to the foregoing description.

Furthermore, the power receiving unit 291 can further include a power sensing unit 2914 for monitoring a voltage and/or current of the rectified power. The power sensing unit 2914 can be configured similarly to the foregoing description.

Figure 8:
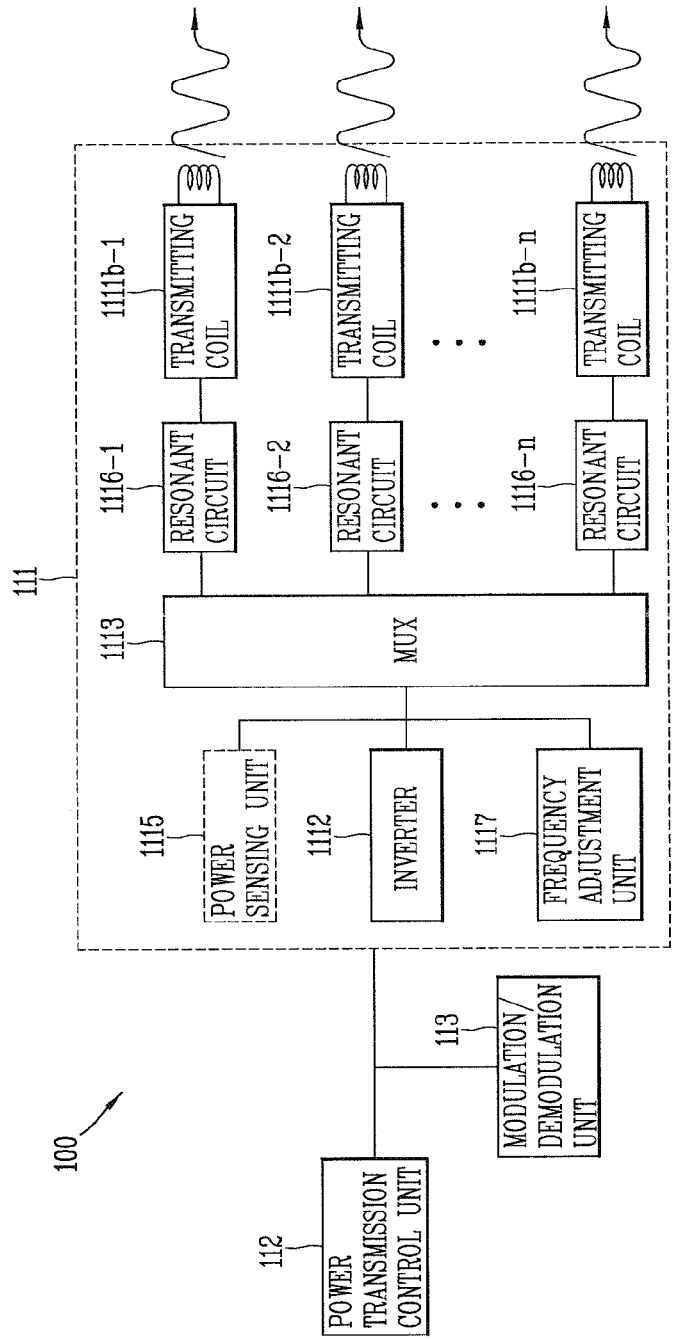
FIG. 8 is a block diagram illustrating a wireless power transmitter configured to have one or more transmission coils receiving power according to an resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein can include one or more transmitting coils 1111b-1 to 1111b-n and resonant circuits (1116-1 to 1116-n) connected to each transmitting coils. Furthermore, the power conversion unit 111 can further include a multiplexer 1113 for establishing and releasing the connection of some of the one or more transmitting coils 1111b-1 to 1111b-n.

The one or more transmitting coils 1111b-1 to 1111b-n can be configured to have the same vibration frequency, or some of them can be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 can be configured to change an inductance and/or capacitance of the resonant circuits (1116-1 to 1116-n) connected to the one or more transmitting coils 1111b-1 to 1111b-n, respectively.

On the other hand, hereinafter, an example of the wireless power transmitter implemented in the form of a wireless charger.

Figure 9:
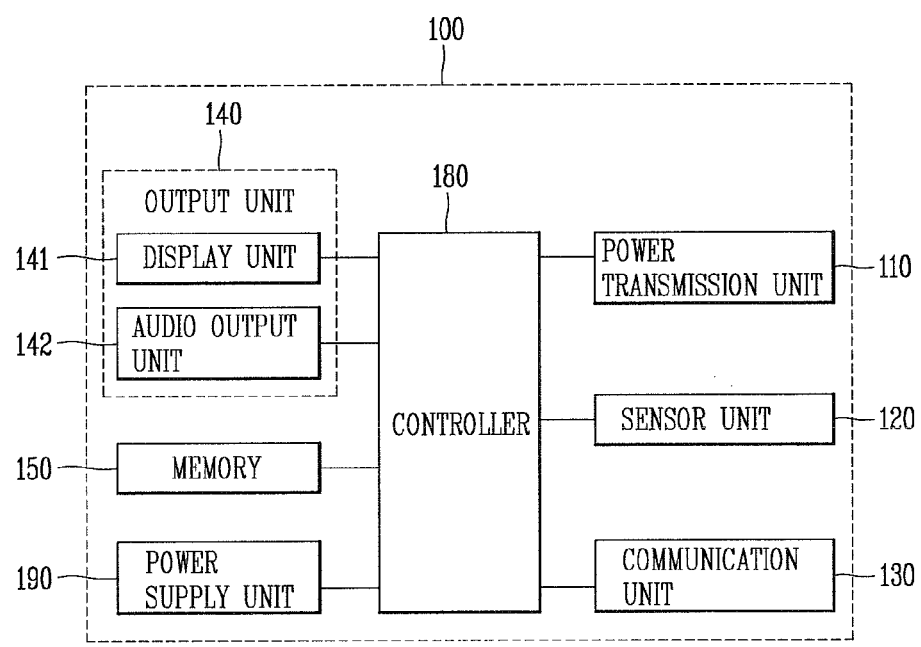
FIG. 9 is a block diagram illustrating a wireless power transmitter further including an additional element in addition to the configuration illustrated in FIG. 2A in accordance with an embodiment of the present invention.

FIG. 9 is a block diagram illustrating a wireless power transmitter further including an additional element in addition to the configuration illustrated in FIG. 2A.

Referring to FIG. 9, the wireless power transmitter 100 can further include a sensor unit 120, a communication unit 130, an output unit 140, a memory 150, and a control unit 180 in addition to the power transmission unit 110 and power supply unit 190 for supporting at least one of the foregoing inductive coupling method and resonance coupling method.

The sensor unit 120 can include a sensor for detecting the location of the electronic device 200. The location information detected by the sensor unit 120 can be used for allowing the power transmission unit 110 to transfer power in an efficient manner.

For instance, with contactless power transfer according to the inductive coupling method, the sensor unit 120 can be operated as a location detection unit, and the location information detected by the sensor unit 120 can be used to move or rotate the transmitting coil 1111a in the power transmission unit 110.

Furthermore, for example, the wireless power transmitter 100 configured to include the foregoing one or more transmitting coils can determine coils that can be placed in an inductive coupling relation or resonance coupling relation to the receiving coil of the electronic device 200 among the one or more transmitting coils based on the location information of the electronic device 200.

On the other hand, the sensor unit 120 can be configured to monitor whether or not the electronic device 200 approaches a chargeable region. The approach or non-approach detection function of the sensor unit 120 can be carried out separately from the function of allowing the power transmission control unit 112 in the power transmission unit 110 to detect the approach or non-approach of the electronic device 200.

The communication unit 130 performs wired or wireless data communication with the electronic device 200. The communication unit 130 can include an electronic component for at least any one of Bluetooth™, Zigbee, Ultra Wide Band (UWB), Wireless USB, Near Field Communication (NFC), and Wireless LAN. For example, the communication unit 130 can transmit a transmission request for content to the electronic device 200, and receive content from the electronic device 200 in response to the transmission request.

The output unit 140 can include at least one of a display unit 141 and an audio output unit 142. The display unit 141 can include at least one of a liquid crystal display (LCD), a thin film transistor-liquid crystal display (TFT-LCD), an organic light-emitting diode (OLED), a flexible display, and a three-dimensional (3D) display. The display unit 141 can display a charging state under the control of the control unit 180.

The memory 150 can store a program for the operation of the control unit 180, and temporarily store input/output data therein. Furthermore, the memory 150 can store a configuration program associated with wireless power reception or wireless charging. The configuration program can be implemented by the control unit 180.

The control unit 180 can control the power transmission unit 110, the sensor unit 120, the communication unit 130, the output unit 140, the memory 150, and the power supply unit 190. The control unit 180 can be implemented with a separate module from the power transmission control unit 112 in the power transmission unit 110 or implemented with a single module.

The power supply unit 190 supplies power to each module within the wireless power transmitter 100.

On the other hand, according to the embodiments disclosed herein, the power transmission unit 110 generates a wireless power signal using power supplied from the power supply unit 190.

Then, the control unit 180 detects the wireless power receiver 200 located in a charging region associated with the wireless power signal. Furthermore, the control unit 180 generates a first control signal for activating the operation of an audio output module 252A provided in the detected wireless power receiver 200 when the wireless power receiver 200 is detected. Furthermore, the control unit 180 controls the power transmission unit 110 or communication unit 130 to transmit the generated first control signal to the detected wireless power receiver 200.

Here, the first control signal can be a control signal for switching the operation mode of the detected wireless power receiver 200 from a handset mode to a speakerphone mode, or a control signal for switching the operation mode of the detected wireless power receiver 200 from a headphone mode to a speaker mode.

On the other hand, the control unit 180 can generate a second control signal for deactivating the operation of the audio output module 252A provided in the detected wireless power receiver 200 when the wireless power receiver 200 is not detected. Then, the control unit 180 controls the power transmission unit 110 or communication unit 130 to transmit the generated second control signal to the detected wireless power receiver 200.

Here, the second control signal can be a control signal for switching the operation mode of the detected wireless power receiver 200 from a speakerphone mode to a handset mode, or a control signal for switching the operation mode of the detected wireless power receiver 200 from a speaker mode to a headphone mode.

However, it would be easily understood by those skilled in the art that the configuration of a wireless power transmitter according to the embodiment disclosed herein can be applicable to an apparatus, such as a docking station, a terminal cradle device, and an electronic device, and the like, excluding when it is applicable to only a wireless charger.

Figure 10:
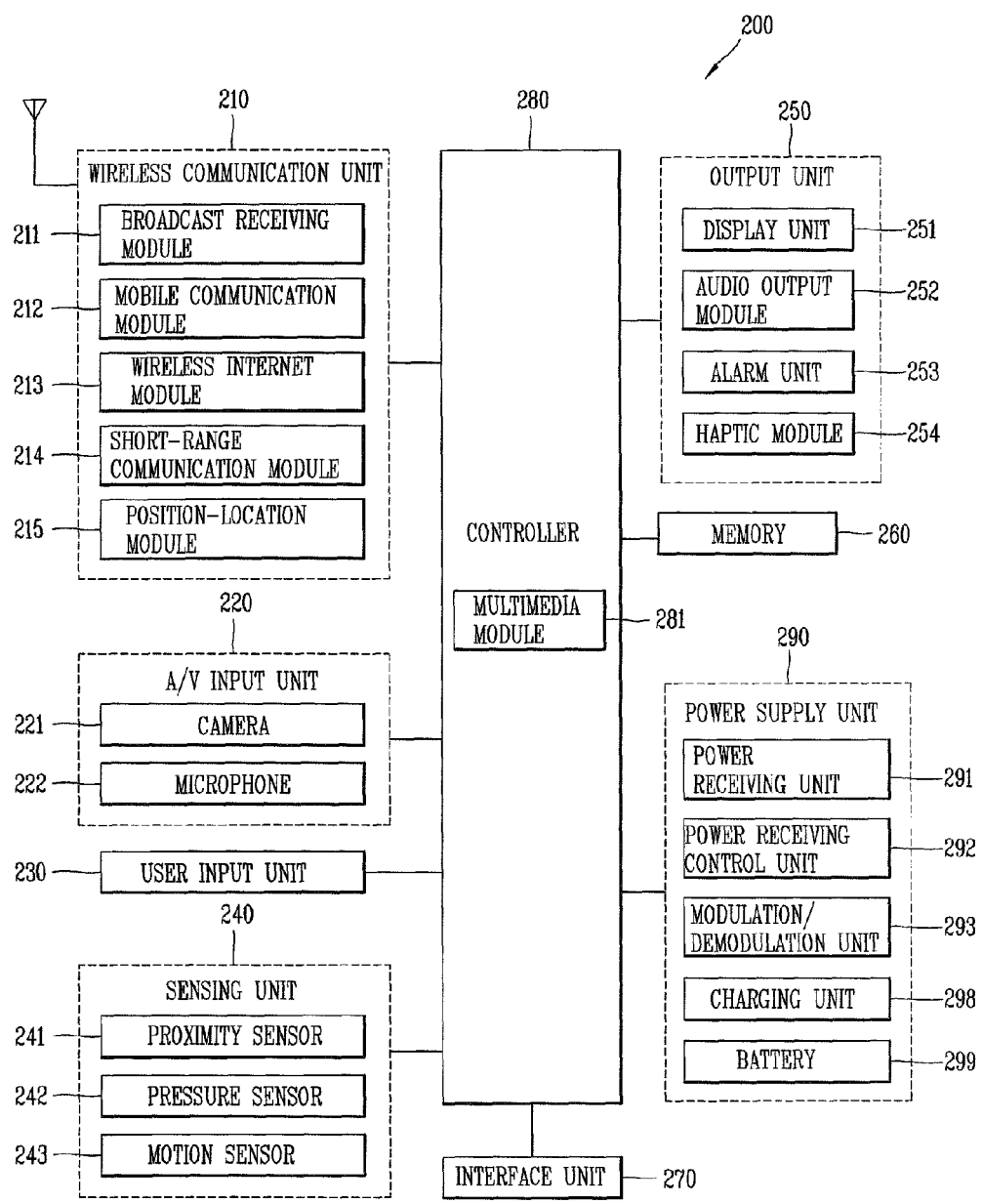
FIG. 10 is view illustrating an electronic device according to the embodiments disclosed herein is implemented in the form of a mobile terminal.

FIG. 10 is view illustrating an electronic device 200 according to the embodiments disclosed herein is implemented in the form of a mobile terminal.

The mobile communication terminal 200 can include a power supply unit 290 illustrated in FIG. 2A, 2B, 4, 7A or 7B Furthermore, the terminal 200 can further include a wireless communication unit 210, an Audio/Video (A/V) input unit 220, a user input unit 230, a sensing unit 240, an output unit 250, a memory 260, an interface unit 270, and a controller 280. FIG. 10 illustrates the terminal 100 having various components, but it is understood that implementing all of the illustrated components is not a requirement. Greater or fewer components can alternatively be implemented.

Hereinafter, each component is described in sequence.

The wireless communication unit 210 can typically include one or more modules which permit wireless communications between the terminal 200 and a wireless communication system or between the terminal 200 and a network within which the terminal 200 is located. For example, the wireless communication unit 210 can include a broadcast receiving module 211, a mobile communication module 212, a wireless internet module 213, a short-range communication module 214, a position location module 215, and the like.

The broadcast receiving module 211 receives a broadcast signal and/or broadcast associated information from an external broadcast managing entity via a broadcast channel.

The broadcast channel can include a satellite channel and a terrestrial channel. The broadcast center can indicate a server which generates and transmits a broadcast signal and/or broadcast associated information or a server which receives a pre-generated broadcast signal and/or broadcast associated information and sends them to the portable terminal. The broadcast signal can be implemented as a TV broadcast signal, a radio broadcast signal, and a data broadcast signal, among others. The broadcast signal can further include a data broadcast signal combined with a TV or radio broadcast signal.

Examples of broadcast associated information can denote information associated with a broadcast channel, a broadcast program, a broadcast service provider, and the like. The broadcast associated information can be provided via a mobile communication network and can be received by the mobile communication module 212.

The broadcast associated information can be implemented in various formats. For instance, broadcast associated information can include Electronic Program Guide (EPG) of Digital Multimedia Broadcasting (DMB), Electronic Service Guide (ESG) of Digital Video Broadcast-Handheld (DVB-H), and the like.

The broadcast receiving module 211 can be configured to receive digital broadcast signals transmitted from various types of broadcast systems. Such broadcast systems can include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 211 can be configured to be suitable for every broadcast system transmitting broadcast signals as well as the digital broadcasting systems.

Broadcast signals and/or broadcast associated information received via the broadcast receiving module 211 can be stored in a suitable device, such as a memory 260.

The mobile communication module 212 transmits/receives wireless signals to/from at least any one of a base station, an external portable terminal, and a server on a mobile communication network. The wireless signal can include audio call signal, video (telephony) call signal, or various formats of data according to transmission/reception of text/multimedia messages.

The wireless internet module 213 supports wireless Internet access for the portable terminal. This module can be internally or externally coupled to the terminal 100. Examples of such wireless Internet access can include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module can include Bluetooth, Radio Frequency IDentification (RFID), Infrared Data Association (IrDA), Ultra-WideBand (UWB), ZigBee, and the like. On the other hand, Universal Serial Bus (USB), IEEE 1394, Thunderbolt of Intel technology, and the like, can be used for wired short-range communication.

The wireless internet module 213 or the short-range communication module 214 can establish data communication connection to the wireless power transmitter 100.

The position location module 215 is a module for acquiring a position of the terminal. An example of the position location module 215 can include a Global Position System (GPS) module.

Referring to FIG. 10, the A/V input unit 220 is configured to provide audio or video signal input to the portable terminal. The A/V input unit 220 can include a camera 221 and a microphone 222. The camera 221 processes image frames of still or moving images obtained by an image sensor in a video call mode or a capture more. The processed image frames can be displayed on the display unit 251.

The image frames processed by the camera 221 can be stored in the memory 260 or transmitted to the exterior via the wireless communication unit 210. Two or more cameras 221 can be provided therein according to the use environment.

The microphone 222 can receive an external audio signal by a microphone in a phone call mode, a recording mode, a voice recognition mode, or the like to process it into electrical audio data. The processed audio data is converted and output into a format transmittable to a mobile communication base station via the mobile communication module 212 in the phone call mode. The microphone 222 can include various noise removal algorithms to remove noises generated while receiving the external audio signal.

The user input unit 230 can generate input data to allow the user to control the operation of the terminal. The user input unit 230 can include a keypad, a dome switch, a touchpad (e.g., static pressure/capacitance), a jog wheel, a jog switch and the like.

The sensing unit 240 can include a proximity sensor 241, a pressure sensor 242, a motion sensor 243, and the like. The proximity sensor 241 detects an object approaching the mobile terminal 200, or the presence or absence of an object existing adjacent to the mobile terminal 200, and the like without any mechanical contact. The proximity sensor 241 can detect a proximity object using a change of the AC magnetic field or static magnetic field, a change rate of the electrostatic capacity, or the like. Two or more proximity sensors 241 can be provided according to the aspect of configuration.

The pressure sensor 242 can detect whether or not a pressure is applied to the mobile terminal 200, a size of the pressure, and the like. The pressure sensor 242 can be provided at a portion where the detection of a pressure is used in the mobile terminal 200 according to the use environment. When the pressure sensor 242 is provided in the display unit 251, it can be possible to identify a touch input through the display unit 251 and a pressure touch input by which a pressure larger than the touch input is applied according to a signal output from the pressure sensor 242. Furthermore, it can be possible to know a size of the pressure applied to the display unit 251 during the input of a pressure touch.

The motion sensor 243 detects the location or movement of the mobile terminal 200 using an acceleration sensor, a gyro sensor, and the like. The acceleration sensor used in the motion sensor 243 is an element for converting an acceleration change in any one direction into an electrical signal. Two or three axes are typically integrated into a package to constitute an acceleration sensor, and only one Z-axis can be used according to the use environment. Accordingly, when an acceleration sensor in the direction of X-axis or Y-axis should be used instead of the direction of Z-axis due to any reason, the acceleration sensor can be erected and mounted on a main substrate using a separate piece substrate. Furthermore, the gyro sensor is a sensor for measuring an angular speed of the mobile terminal 200 in a rotational movement to detect a rotated angle with respect to each reference direction. For instance, the gyro sensor can detect each rotational angle, i.e., azimuth, pitch and roll, with reference to three directional axes.

The output unit 250 is provided to output visual, auditory, or tactile information. The output unit 250 can include a display unit 251, an audio output module 252, an alarm unit 253, a haptic module 254, and the like.

The display unit 251 can display (output) information processed in the terminal 200. For example, when the terminal is in a phone call mode, the display unit 251 will provide a User Interface (UI) or Graphic User Interface (GUI) associated with the call. When the terminal is in a video call mode or a capture mode, the display unit 251 can display images captured and/or received, UI, or GUI.

The display unit 251 can include at least one of a liquid crystal display (LCD), a thin film transistor-liquid crystal display (TFT-LCD), an organic light-emitting diode (OLED), a flexible display, a three-dimensional (3D) display, and the like.

Some of those displays can be configured as a transparent type or a light transmission type through which the outside is visible, which is referred to as a transparent display. A representative example of the transparent display can include a Transparent OLED (TOLED), or the like. The rear surface of the display unit 151 can also be implemented to be optically transparent. Under this configuration, the user can view an object positioned at a rear side of the terminal body through a region occupied by the display unit 251 of the terminal body.

The display unit 251 can be implemented in two or more in number according to a configured aspect of the terminal 200. For instance, a plurality of the display units 251 can be arranged on one surface to be spaced apart from or integrated with each other, or can be arranged on different surfaces.

Here, if the display unit 251 and a touch sensitive sensor (hereinafter, referred to as a touch sensor) have a layered structure therebetween (hereinafter, referred to as a touch screen), the display unit 251 can be used as an input device rather than an output device. The touch sensor can be implemented as a touch film, a touch sheet, a touch pad, and the like.

The touch sensor can be configured to convert changes of a pressure applied to a specific part of the display unit 251, or a capacitance occurring from a specific part of the display unit 251, into electric input signals. Also, the touch sensor can be configured to sense not only a touched position and a touched area, but also a touch pressure.

When touch inputs are sensed by the touch sensors, corresponding signals are sent to a touch controller. The touch controller processes the received signals, and then transmits corresponding data to the controller 280. Accordingly, the controller 280 can sense which region of the display unit 151 has been touched.

The proximity sensor 241 can be arranged at an inner region of the terminal covered by the touch screen, or near the touch screen. The proximity sensor refers to a sensor to sense the presence or absence of an object approaching a surface to be sensed, or an object disposed near a surface to be sensed, using an electromagnetic field or infrared rays without a mechanical contact. The proximity sensor has a longer lifespan and a more enhanced utility than a contact sensor.

The example of the proximity sensor can include a transmissive type photoelectric sensor, a direct reflective type photoelectric sensor, a minor reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. The touch screen (touch sensor) can be categorized into a proximity sensor.

Hereinafter, for the sake of brief explanation, a status that the pointer is positioned to be proximate onto the touch screen without contact will be referred to as a "proximity touch", whereas a status that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns can be output onto the touch screen.

The audio output module 252 can output audio data received from the wireless communication unit 210 or stored in the memory 260, in a call-receiving mode, a call-placing mode, a recording mode, a voice recognition mode, a broadcast reception mode, and so on. The audio output module 252 can output audio signals relating to functions performed in the terminal 200, e.g., sound alarming a call received or a message received, and so on. The audio output module 252 can include a receiver, a speaker, a buzzer, and so on.

The alarm 253 outputs signals notifying the occurrence of an event from the terminal 200. The event occurring from the terminal 100 can include call received, message received, key signal input, touch input, and so on. The alarm 253 can output not only video or audio signals, but also other types of signals such as signals notifying occurrence of events in a vibration manner. Because the video or audio signals can be output through the display unit 251 or the audio output unit 252, the display unit 251 and the audio output module 252 can be categorized into part of the alarm 253.

The haptic module 254 generates various tactile effects which a user can feel. A representative example of the tactile effects generated by the haptic module 254 includes vibration. Vibration generated by the haptic module 254 can have a controllable intensity, a controllable pattern, and so on. For instance, different vibration can be output in a synthesized manner or in a sequential manner.

The haptic module 254 can generate various tactile effects, including not only vibration, but also arrangement of pins vertically moving with respect to a skin being contacted, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 can be configured to transmit tactile effects through the user's direct contact, or the user's muscular sense using a finger or a hand. The haptic module 254 can be implemented in two or more in number according to the configuration of the terminal 200.

The memory 260 can store a program for the processing and control of the controller 280. Alternatively, the memory 260 can temporarily store input/output data (e.g., phonebook data, messages, still images, video and the like). Also, the memory 260 can store data related to various patterns of vibrations and audio output upon the touch input on the touch screen.

In addition, the memory 260 can store a configuration program associated with contactless power transfer or wireless charging. The configuration program can be implemented by the controller 280.

Furthermore, the memory 260 can store an application associated with contactless power transfer (or wireless charging) downloaded from an application providing server (for example, an app store). The wireless charging related application is a program for controlling wireless charging transmission, and thus the electronic device 200 can receive power from the wireless power transmitter 100 in a wireless manner or establish connection for data communication with the wireless power transmitter 100 through the relevant program.

The memory 260 can be implemented using any type of suitable storage medium including a flash memory type, a hard disk type, a multimedia card micro type, a memory card type (e.g., SD or xD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Also, the terminal 200 can be operated in association with a web storage performing the storage function of the memory 160 on the Internet.

The interface unit 270 can generally be implemented to interface the portable terminal with all external devices. The interface unit 270 can allow a data reception from an external device, a power delivery to each component in the terminal 200, or a data transmission from the terminal 200 to an external device. The interface unit 270 can include, for example, wired/wireless headset ports, external charger ports, wired/wireless data ports, memory card ports, ports for coupling devices having an identification module, audio input/output (I/O) ports, video input/output (I/O) ports, earphone ports, and the like.

The identification module can be configured as a chip for storing various information used to authenticate an authority to use the terminal 200, which can include a User Identity Module (UIM), a Subscriber Identity Module (SIM), and the like. Also, the device having the identification module (hereinafter, referred to as "identification device") can be implemented in a type of smart card. Hence, the identification device can be coupled to the terminal 200 via a port.

Also, the interface unit can serve as a path for power to be supplied from an external cradle to the terminal 200 when the terminal 100 is connected to the external cradle or as a path for transferring various command signals input from the cradle by a user to the terminal 200. Such various command signals or power input from the cradle can operate as signals for recognizing that the terminal 200 has accurately been mounted to the cradle.

The controller 280 typically controls the overall operations of the terminal 200. For example, the controller 280 performs the control and processing associated with telephony calls, data communications, video calls, and the like. The controller 280 can include a multimedia module 281 for multimedia playback. The multimedia module 281 can be implemented within the controller 280, or implemented separately from the controller 280. Furthermore, the control unit 180 can be implemented with a separate module from the power receiving control unit 292 within the power supply unit 290 illustrated with reference to FIGS. 2A and 2B, or implemented with a single module.

The controller 280 can perform a pattern recognition processing so as to recognize a writing input or image drawing input carried out on the touch screen as a text or image.

The controller 280 performs wired or wireless charging according to the user input or internal input. Here, the internal input represents a signal for notifying that an induced current generated from a secondary coil within the terminal has been detected.

When the foregoing wireless charging is carried out, an operation of allowing the controller 280 to control each constituent element will be described in detail below with reference to the operation phase in FIG. 14. As described above, the power receiving control unit 292 within the power supply unit 290 can be implemented to be included in the controller 280, and in the present disclosure, it should be understood that the controller 280 performs the operation by the power receiving control unit 292.

The power supply unit 290 receives internal and external power under the control of the controller 280 to supply power used for the operation of each constituent element.

The power supply unit 290 includes a battery 299 for supplying power to each constituent element of the terminal 200, and the battery 299 can include a charger 298 for performing wired or wireless charging.

On the other hand, according to the embodiments disclosed herein, the power receiving unit 291 receives a wireless power signal from the wireless power transmitter 100.

The controller 280 detects the wireless power transmitter 100 located in a charging region associated with the wireless power signal using the wireless power signal, and activates the operation of the first audio output module 252A when the wireless power transmitter 100 is detected. Furthermore, the controller 280 deactivates the operation of the second audio output module 252B when the first audio output module 252A is activated.

According to a first embodiment, the first audio output module 252A can be a speakerphone speaker, and the second audio output module 252B can be a handset speaker. Furthermore, the controller 280 switches the operation mode of the wireless power receiver 200 from a handset mode to a speakerphone mode when the wireless power transmitter 100 is detected.

In addition, according to a second embodiment, the interface unit 270 transmits an audio signal to an audio output device connected thereto, and the controller 280 suspends a transmission of the audio signal when the operation of the first audio output module 252A is activated. Here, the audio output device can be a headphone in a wired or wireless manner. Furthermore, the controller 280 switches the operation mode of the wireless power receiver 200 from a headphone mode to a speaker mode when the wireless power transmitter 100 is detected.

On the other hand, the controller 280 deactivates the first audio output module 252A when the wireless power transmitter 100 is not detected. According to a first embodiment, the controller 280 switches the operation mode of the wireless power receiver 200 from a speakerphone mode to a handset mode when the wireless power transmitter 100 is not detected. According to a second embodiment, the controller 280 switches the operation mode of the wireless power receiver 200 from a speaker mode to a headphone mode when the wireless power transmitter 100 is not detected.

On the other hand, the controller 280 can detect the wireless power transmitter 100 based on a strength of the wireless power signal. Furthermore, the power receiving unit 291 receives power from the wireless power transmitter 100 in a wireless manner when the wireless power transmitter 100 is detected.

The display unit 251 outputs a menu for activating the operation of the first audio output module 252A. The user input unit 230 receives an input to select a menu for activating the operation of the first audio output module 252A. The controller 280 activates the operation of the first audio output module 252A upon receiving the input. Furthermore, the output unit 250 outputs an indicator indicating an active state of the operation of the first audio output module 252A.

The present disclosure discloses a mobile terminal as an example of the apparatus for receiving power in a wireless manner, but it would be easily understood by those skilled in the art that the configuration according to the embodiment disclosed herein can be applicable to a stationary terminal, such as a digital TV, a desktop computer, and the like, excluding when applicable to only the mobile terminal.

FIGS. 7A and 7B are views illustrating the concept of transmitting and receiving a packet between a wireless power transmitter and an electronic device through the modulation and demodulation of a wireless power signal in transmitting wireless power disclosed herein.

Figure 11A:
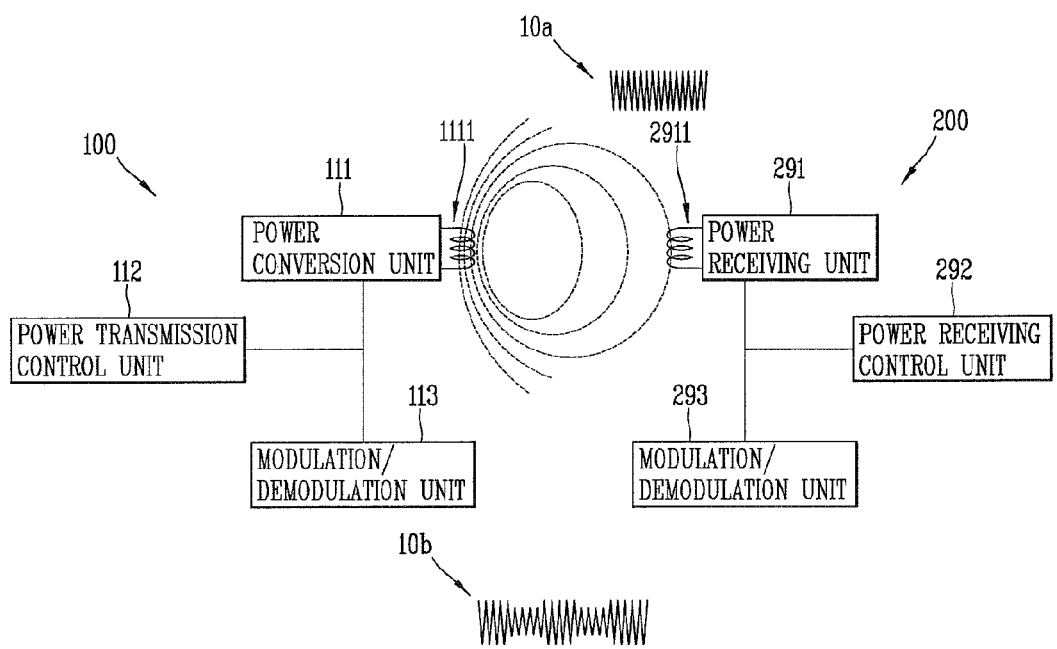
FIGS. 11A and 11B are views illustrating transmitting and receiving a packet between a wireless power transmitter and an electronic device through the modulation and demodulation of a wireless power signal in transmitting wireless power disclosed herein in accordance with an embodiment of the present invention.

Referring to FIG. 11A, the wireless power signal formed by the power conversion unit 111 forms a closed-loop within a magnetic field or electromagnetic field, and therefore, when the electronic device 200 modulates the wireless power signal while receiving the wireless power signal, the wireless power transmitter 100 can detect the modulated wireless power signal. The power communications modulation/demodulation unit 113 can demodulates the detected wireless power signal, and decodes the packet from the modulated wireless power signal.

On the other hand, a modulation method used for communication between the wireless power transmitter 100 and the electronic device 200 can be amplitude modulation. As described above, the amplitude modulation method can be a backscatter modulation method in which the power communications modulation/demodulation unit 293 at the side of the electronic device 200 changes an amplitude of the wireless power signal 10*a* formed by the power conversion unit 111 and the power receiving control unit 292 at the side of the wireless power transmitter 100 detects an amplitude of the modulated wireless power signal 10*b*.

Figure 11B:
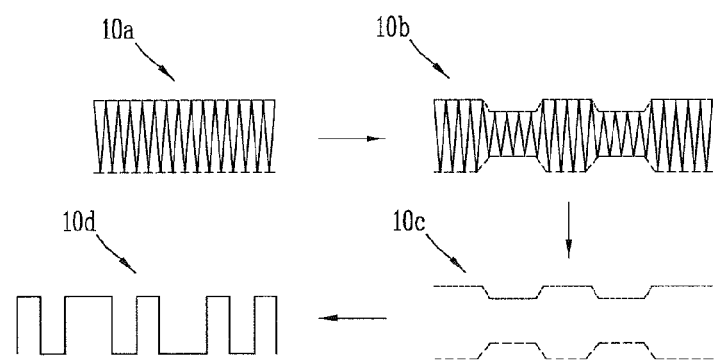

Specifically, further referring to FIG. 11B, the power receiving control unit 292 at the side of the electronic device 200 modulates the wireless power signal 10*a* received through the power receiving unit 291 by changing a load impedance within the power communications modulation/demodulation unit 293. The power receiving control unit 292 modulates the wireless power signal 10*a* to include a packet including a power control message to be transmitted to the wireless power transmitter 100.

Then, the power transmission control unit 112 at the side of the wireless power transmitter 100 demodulates the modulated wireless power signal 10*b* through an envelope detection process, and decodes the detected signal 10*c* into digital data 10*d*. The demodulation process detects a current or voltage flowing into the power conversion unit 111 to be classified into two states, a HI state and a LO state, and acquires a packet to be transmitted by the electronic device 200 based on digital data classified according to the states.

Hereinafter, a process of allowing the wireless power transmitter 100 to acquire a power control message to be transmitted by the electronic device 200 from the demodulated digital data will be described.

Figure 12A:
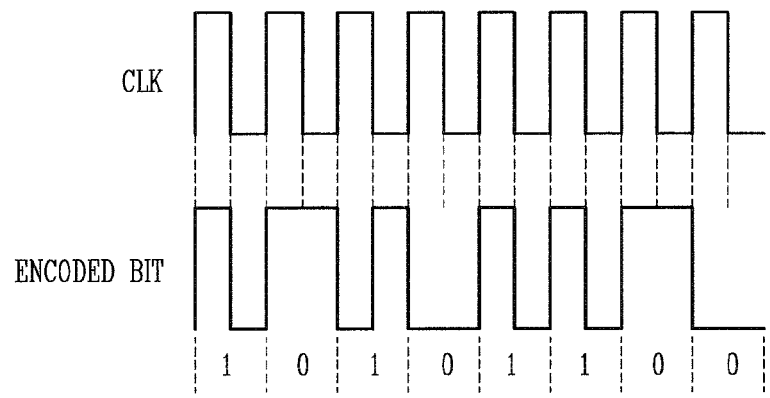
FIGS. 12A and 12B are views illustrating a method of showing data bits and byte constituting a power control message provided by the wireless power transmitter in accordance with an embodiment of the present invention.
Figure 12B:
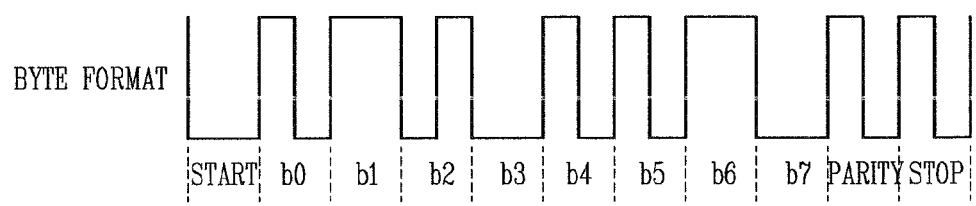

FIGS. 12A and 12B are views illustrating a method of showing data bits and byte constituting a power control message provided by the wireless power transmitter 100.

Referring to FIG. 12A, the power transmission control unit 112 detects an encoded bit using a clock signal (CLK) from an envelope detected signal. The detected encoded bit is encoded according to a bit encoding method used in the modulation process at the side of the electronic device 200. The bit encoding method can correspond to any one of non-return to zero (NRZ) and bi-phase encoding.

For instance, the detected bit can be a differential bi-phase (DBP) encoded bit. According to the DBP encoding, the power receiving control unit 292 at the side of the electronic device 200 is allowed to have two state transitions to encode data bit 1, and to have one state transition to encode data bit 0. In other words, data bit 1 can be encoded in such a manner that a transition between the HI state and LO state is generated at a rising edge and falling edge of the clock signal, and data bit 0 can be encoded in such a manner that a transition between the HI state and LO state is generated at a rising edge of the clock signal.

On the other hand, the power transmission control unit 112 can acquire data in a byte unit using a byte format constituting a packet from a bit string detected according to the bit encoding method. For instance, the detected bit string can be transferred by using an 11-bit asynchronous serial format as illustrated in FIG. 12C. In other words, the detected bit can include a start bit indicating the beginning of a byte and a stop bit indicating the end of a byte, and also include data bits (b0 to b7) between the start bit and the stop bit. Furthermore, it can further include a parity bit for checking an error of data. The data in a byte unit constitutes a packet including a power control message.

Figure 13:
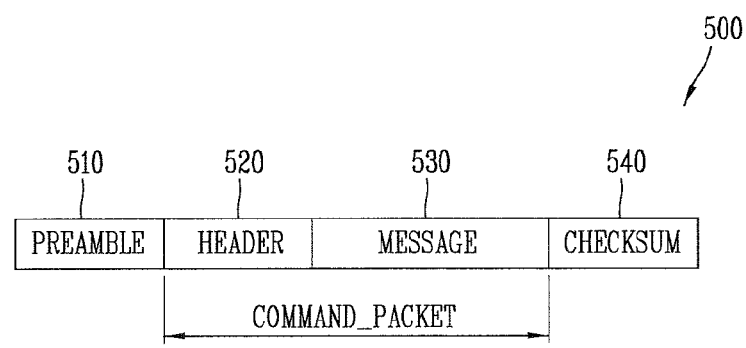
FIG. 13 is a view illustrating a packet including a power control message used in a contactless power transfer method according to the embodiments disclosed herein.

FIG. 13 is a view illustrating a packet including a power control message used in a contactless power transfer method according to the embodiments disclosed herein.

The packet 500 can include a preamble 510, a header 520, a message 530, and a checksum 540.

The preamble 510 can be used to perform synchronization with data received by the wireless power transmitter 100 and detect the start bit of the header 520. The preamble 510 can be configured to repeat the same bit. For instance, the preamble 510 can be configured such that data bit 1 according to the DBP encoding is repeated eleven to twenty five times.

The header 520 can be used to indicate a type of the packet 500. A size of the message 530 and the kind thereof can be determined based on a value indicated by the header 520. The header 520 is a value having a predetermined size to be positioned subsequent to the preamble 510. For instance, the header 520 can be a byte in size.

The message 530 can be configured to include data determined based on the header 520. The message 530 has a predetermined size according to the kind thereof.

The checksum 540 can be used to detect an error that can be occurred in the header 520 and the message 530 while transmitting a power control message. The header 520 and the message 530 excluding the preamble 510 for synchronization and the checksum 540 for error checking can be referred to as command-packet.

Hereinafter, the operating phases of the wireless power transmitter 100 and the wireless power receiver 200 will be described.

Figure 14:
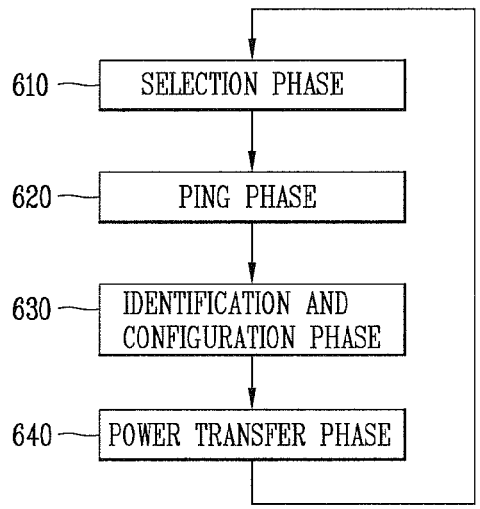
FIG. 14 is a view illustrating the operation phases of the wireless power transmitter and electronic device according to the embodiments disclosed herein.

FIG. 14 is a view illustrating the operation phases of the wireless power transmitter 100 and electronic device 200 according to the embodiments disclosed herein.

Referring to FIG. 14, the operation phases of the wireless power transmitter 100 and the electronic device 200 for contactless power transfer can be divided into a selection state 610, a ping state 620, an identification and configuration state 630, and a power transfer state 640.

The wireless power transmitter 100 detects whether or not objects exist within a range that the wireless power transmitter 100 can transmit power in a wireless manner and performs a detection process to select the electronic device 200 existing in a semi-active area or in a semi-charging area. in the selection state 610, and the wireless power transmitter 100 sends a detection signal to the detected object and the electronic device 200 sends a response to the detection signal in the ping state 620. The electronic device 200 placed existing in the semi-active area can exchange a power control message with the wireless power transmitter 100. Compared to the detection process of the electronic device 200 in the semi-active area using a characteristic of the wireless power signal and the like in the selection state 610, the detection process based on exchanging the power control message in the ping state 620 can be referred to as a digital ping process.

Furthermore, the wireless power transmitter 100 identifies the electronic device 200 selected through the previous states and acquires configuration information for power transfer in the identification and configuration state 630. The electronic device 200 in the identification and configuration state 630, which is placed in the semi-active area, can transmit a power control message including its own identification information. The wireless power transmitter 100 transmits power to the electronic device 200 while controlling power transmitted in response to a control message received from the electronic device 200 in the power transfer state 640.

Figure 15:
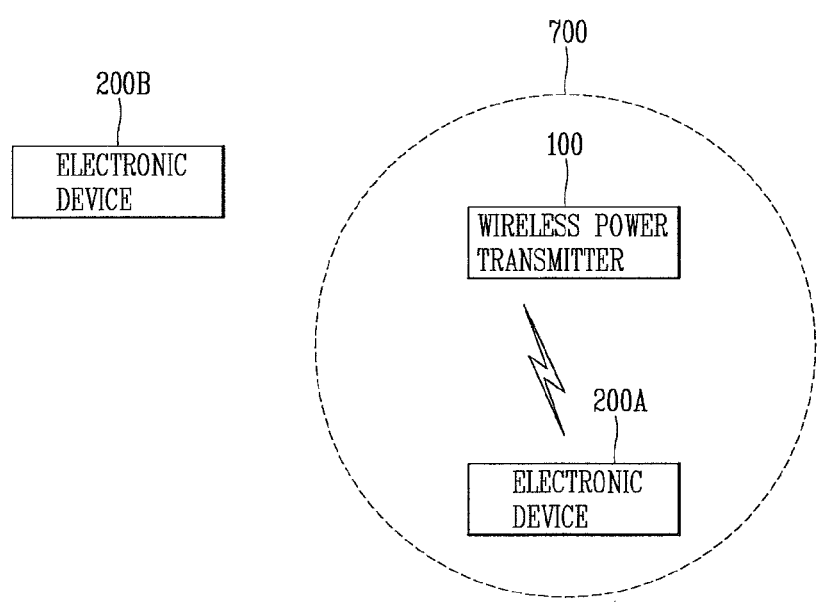
FIG. 15 is a block diagram illustrating a wireless power transfer system according to an embodiment disclosed herein.

FIG. 15 is a block diagram illustrating a wireless power transfer system according to an embodiment disclosed herein.

The wireless power transmitter 100 forms a wireless power signal using power supplied from the power supply unit 190. As the wireless power signal is formed by the wireless power transmitter 100, a region 700 (hereinafter, referred to as a charging region) for allowing the wireless power transmitter 100 to transfer power to at least one electronic device 200 in a wireless manner is formed.

The electronic device 200 receives a wireless power signal from the wireless power transmitter 100, and detects the wireless power transmitter 100 located in the charging region 700 using the received wireless power signal. The electronic device 200 activates the operation of the first audio output module 252A provided in the electronic device 200 when the wireless power transmitter 100 is detected. As the operation of the first audio output module 252A is activated, the operation of the second audio output module 252B provided in the electronic device 200 is deactivated (200A).

The electronic device 200 transmits a power control message including identification information and/or configuration information to the wireless power transmitter 100 located in the charging region 700, and receives power from the wireless power transmitter 100 in a wireless manner based on the transmitted power control message. While the electronic device 200 receives power from the wireless power transmitter 100 in a wireless manner, the electronic device 200 can transmit a power control message to the wireless power transmitter 100, and the wireless power transmitter 100 can control a characteristic of the power applied to a transmitting coil according to the transmitted power control message.

On the other hand, the electronic device 200 monitors whether the wireless power transmitter 100 located in the charging region 700 is continuously detected. If the wireless power transmitter 100 is not detected any more in the charging region 700, then the electronic device 200 deactivates the operation of the first audio output module 252A. As the operation of the first audio output module 252A is deactivated, the operation of the second audio output module 252B is activated (200B).

The wireless power transmitter 100 performs a detection process for selecting the electronic device 200 existing within the charging region 700. For example, the wireless power transmitter 100 can detect a change of the power amount for forming a wireless power signal to check whether the electronic device 200 exists within the charging region 700 (analog detection process). Furthermore, the wireless power transmitter 100 can recognize the electronic device 200 located within the charging region by demodulating the wireless power signal modulated by the electronic device 200 existing within the charging region, and acquiring a power control message from the modulated wireless power signal (digital detection process).

The wireless power transmitter 100 can generate a first control signal for activating the operation of the audio output module 252A provided in the detected electronic device 200, and transmit the generated first control signal to the detected electronic device 200. The electronic device 200 activates the operation of the audio output module 252A provided in the electronic device 200 according to the received first control signal. As the operation of the audio output module 252A provided in the electronic device 200 is activated, the operation of the other audio output module 252B provided in the electronic device 200 is deactivated (200A).

The wireless power transmitter 100 receives a power control message including identification information and/or configuration information from the electronic device 200 located in the charging region 700, and transmits power to the electronic device 200 in a wireless manner based on the power control message received from the electronic device 200. While the wireless power transmitter 100 transmits power to the electronic device 200 in a wireless manner, the wireless power transmitter 100 can receive a power control message from the electronic device 200 and control a characteristic of the power applied to a transmitting coil according to the received power control message.

On the other hand, the wireless power transmitter 100 monitors whether the electronic device 200 located in the charging region 700 is continuously detected. If the electronic device 200 is not detected any more in the charging region 700, then the wireless power transmitter 100 can generate a second control signal for deactivating the operation of the audio output module 252A provided in the electronic device 200, and transmit the generated second control signal to the electronic device 200. The electronic device 200 deactivates the operation of the audio output module 252A provided in the electronic device 200 according to the received second control signal. As the operation of the audio output module 252A is deactivated, the operation of the other audio output module 252B provided in the electronic device 200 is activated (200B).

Furthermore, the wireless power transmitter 100 can monitor parameters within a power transfer contract generated based on the identification information and/or configuration information, and maintain or cancel power transfer based on the monitoring result. Otherwise, the wireless power transmitter 100 can terminate power transfer based on a power control message received from the electronic device 200.

Figure 16:
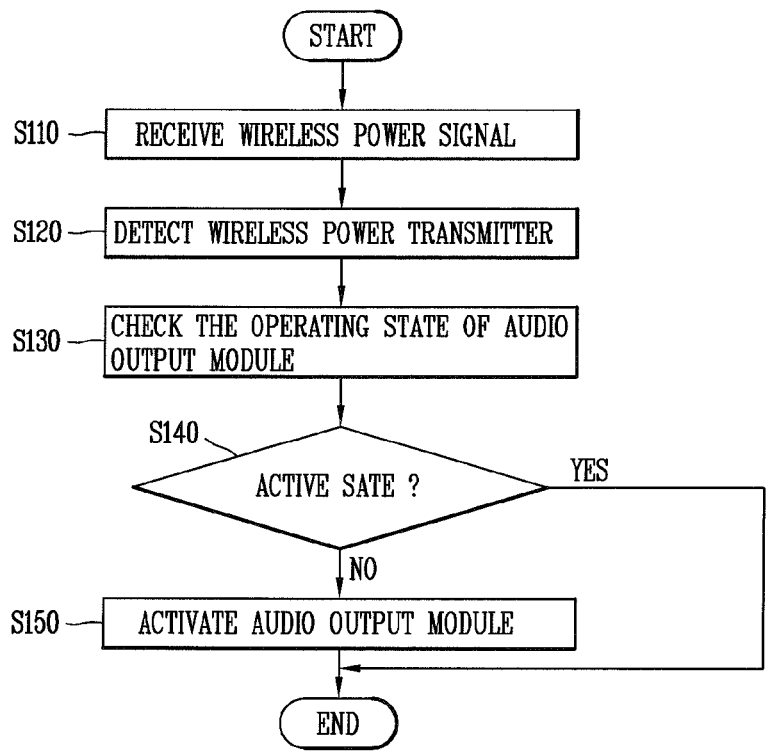
FIG. 16 is a flow chart illustrating an operation control process in the electronic device according to the embodiments disclosed herein.

FIG. 16 is a flow chart illustrating an operation control process in the electronic device 200 according to the embodiments disclosed herein.

The power receiving unit 291 receives a wireless power signal from the wireless power transmitter 100 (S110). The controller 280 detects the wireless power transmitter 100 located in the charging region 700 using the received wireless power signal (S120). When the wireless power transmitter 100 is detected, the controller 280 checks whether the operation of the first audio output module 252A is in active state (S130). In the step of S140, when the operation of the first audio output module 252A is not in active state, the controller 280 activates the operation of the first audio output module 252A (S150). When the operation of the first audio output module 252A is activated, the controller 280 deactivates the operation of the second audio output module 252B.

Figure 17:
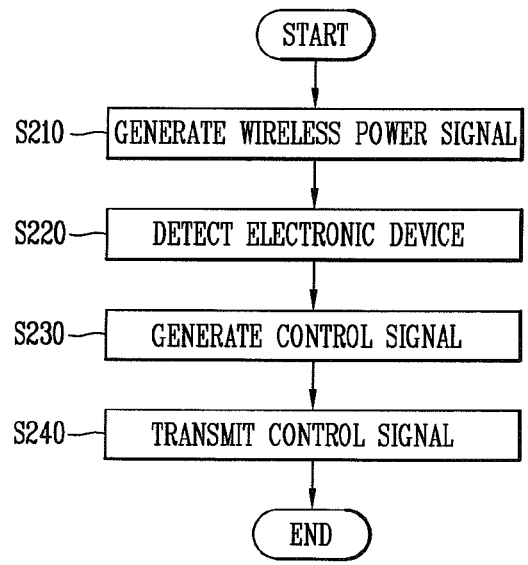
FIG. 17 is a flow chart illustrating an operation control process in the wireless power transmitter according to the embodiments disclosed herein.

FIG. 17 is a flow chart illustrating an operation control process in the wireless power transmitter 100 according to the embodiments disclosed herein.

The power transmission unit 110 forms a wireless power signal using power supplied from the power supply unit 190 (S210). As the wireless power signal is formed, the charging region 700 is formed. The control unit 180 detects the electronic device 200 located in the charging region 700 (S220). When the electronic device 200 is detected, the control unit 180 generates a control signal for activating the operation of the first audio output module 252A provided in the electronic device 200 (S230). The control unit 180 controls the power transmission unit 110 or communication unit 130 to transmit the control signal to the detected electronic device 200 (S240). For example, the power transmission unit 110 can transmit a wireless power signal by modulating it to the electronic device 200 such that the wireless power signal includes a packet reflecting the control signal. Otherwise, the communication unit 130 can transmit a communication signal by modulating it to the electronic device 200 such that the wireless communication signal includes a packet reflecting the control signal.

The electronic device 200 can decode the wireless power signal or wireless communication signal to decipher the packet. The electronic device 200 can check whether the operation of the first audio output module provided in the electronic device 200 is in an active state according to the control signal included in the packet, and activates the operation of the first audio output module 252A provided in the electronic device 200 when the operation of the first audio output module 252A provided in the electronic device 200 is not in an active state. When the operation of the first audio output module 252A is activated, the electronic device 200 deactivates the operation of the second audio output module 252B.

Figure 18:
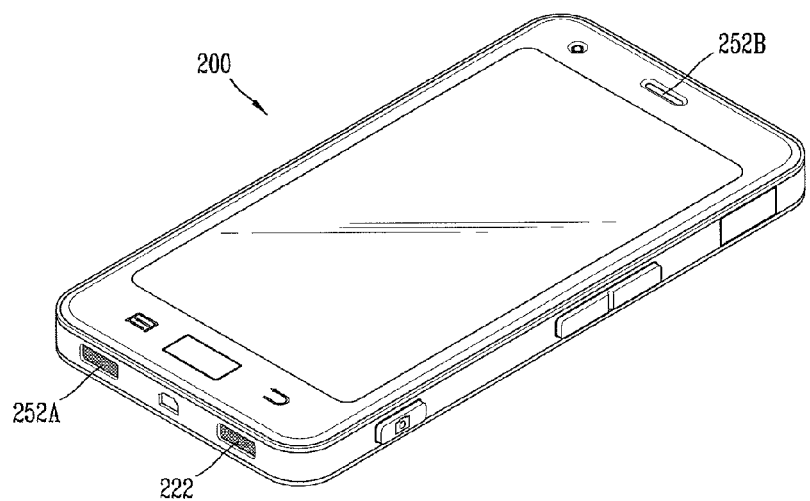
FIG. 18 is a conceptual view illustrating the electronic device according to a first embodiment disclosed herein.

FIG. 18 is a conceptual view illustrating the electronic device 200 according to a first embodiment disclosed herein.

While having a conversation over the phone using the electronic device 200, the electronic device 200 can be operated in a handset mode or speakerphone mode. When the phone communication is established, the electronic device 200 can be set to a default mode. For example, the electronic device 200 can be configured to be initially operated in a handset mode for all phone communications. Otherwise, the electronic device 200 can be configured to be operated in the previous communication mode for all phone communications. Otherwise, the operation mode of the electronic device 200 can be configured by allowing the user to manually select a communication mode prior to or during the communication. Based on the configuration of the communication mode, the controller 280 can output an audio signal received from an external terminal to a speakerphone speaker 252A or handset speaker 252B.

Phone conversation in a speakerphone mode uses the speakerphone speaker 252A. In other words, the first audio output module 252A is activated in a speakerphone mode, and an audio signal received from the external terminal is output through the speakerphone speaker 252A. On the contrary, phone conversation in a handset mode uses the handset speaker 252B. In other words, the handset speaker 252B is activated in a handset mode, and an audio signal received from the external terminal is output through the handset speaker 252B. Because the handset speaker 252B is located in closer proximity to the user's ear while using the handset speaker 252B, the speakerphone speaker 252A outputs an audio signal in a higher volume than the handset speaker 252B.

Furthermore, while having a conversation over the phone using the electronic device 200, the user's voice can be input through a microphone 222. The user's voice can be input through the microphone 222 in both a speakerphone mode and a handset mode. However, otherwise, a speakerphone mode microphone and a handset mode microphone can be implemented in a different way from each other. For example, the microphone 222 can be a handset mode microphone, and a speakerphone mode microphone can be additionally provided in the electronic device 200.

The electronic device 200 receives a wireless power signal from the wireless power transmitter 100, and detects the wireless power transmitter 100 located in the charging region 700 using the received wireless power signal. When the wireless power transmitter 100 is detected, the electronic device 200 checks whether the operation mode of the electronic device 200 is a speakerphone mode, and switches the operation mode of the electronic device 200 to a speakerphone mode when it is not in a speakerphone mode (for example, a handset mode). Then, when the wireless power transmitter 100 is not detected, the electronic device 200 switches the operation mode of the electronic device 200 to a handset mode again.

Figure 19:
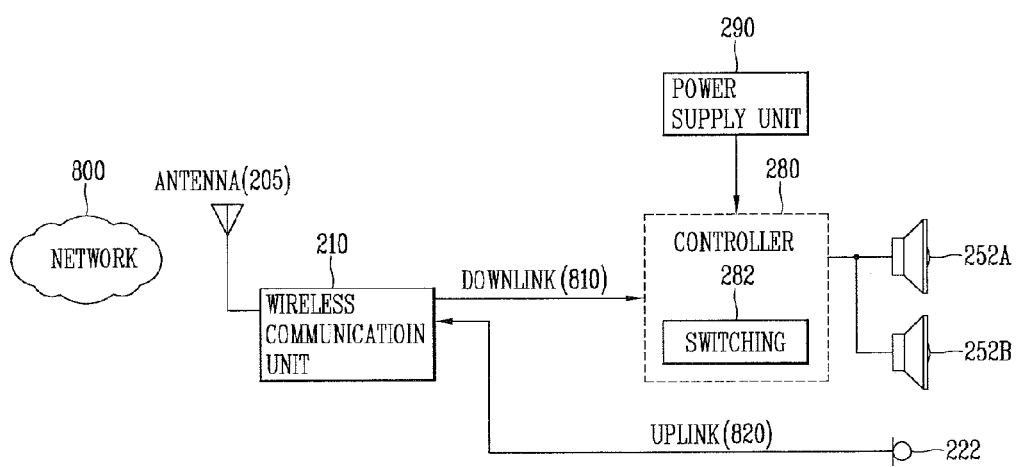
FIG. 19 is a block diagram illustrating the electronic device having a switching function of the phone call mode in a wireless power transmitting and receiving environment according to a first embodiment disclosed herein.

FIG. 19 is a block diagram illustrating the electronic device 200 having a switching function of the phone call mode in a wireless power transmitting and receiving environment according to a first embodiment disclosed herein.

The electronic device 200 can include an antenna 205 connected to the wireless charging apparatus 210 to transmit and/or receive a signal for wireless communication between a near end user and a far end user. Furthermore, an uplink channel 820 and a downlink channel 810 can be implemented in the electronic device 200. The uplink channel 820 can be a channel for transmitting an audio signal generated from the user of the electronic device 200 that is acquired by the microphone 222 through a network 800. In other words, when the user of the electronic device 200 speaks out, its audio signal will be transferred to the counterpart through the uplink channel 820. The downlink channel 810 can be a channel for receiving an audio signal from an external terminal through the network 800. In other words, when the counterpart speaks out, its audio signal will be transferred to the user of the electronic device 200 through the downlink channel 810.

As described above, the controller 280 outputs an audio signal received through the downlink channel 810 to the speakerphone speaker 252A in a speakerphone mode, and the controller 280 outputs an audio signal received through the downlink channel 810 to the handset speaker 252B in a handset mode. For this purpose, the controller 280 can include a switching unit 282 for outputting an audio signal received through the downlink channel 810 to the speakerphone speaker 252A or handset speaker 252B according to the phone communication mode.

While having a conversation over the phone in a handset mode in which an audio signal received through the downlink channel 810 is output through the handset speaker 252B, the power receiving unit 291 receives a wireless power signal from the wireless power transmitter 100. Then, the controller 280 detects the wireless power transmitter 100 located in the charging region 700 using the wireless power signal, and switches the operation mode of the electronic device 200 to a speakerphone mode in which an audio signal received through the downlink channel 810 is output through the speakerphone speaker 252A when the wireless power transmitter 100 is detected. The display unit 251 can display an indicator reflecting the operation mode of the electronic device 200. The operation mode of the electronic device 200 can indicate an active state of the speakerphone speaker 252A.

While having a conversation over the phone in a speakerphone mode in which an audio signal received through the downlink channel 810 is output through the speakerphone speaker 252A, the power receiving unit 291 can continuously receive a wireless power signal from the wireless power transmitter 100. Then, the controller 280 determines whether the wireless power transmitter 100 located in the charging region 700 is detected in a predetermined period, and switches the operation mode of the electronic device 200 again to a handset mode in which an audio signal received through the downlink channel 810 is output through the handset speaker 252B when the wireless power transmitter 100 is not detected any more. Furthermore, the display unit 251 can display an indicator reflecting the operation mode of the electronic device 200. The operation mode of the electronic device 200 can indicate an active state of the handset speaker 252B.

Accordingly, when the power of the electronic device 200 is insufficient and thus charging is required while having a conversation over the phone in a handset mode, the user can conveniently perform continuous phone communication by automatically switching the operation mode to a speakerphone mode while at the same time charging the electronic device 200 using the wireless power transmitter 100. Furthermore, when the power of the electronic device 200 is sufficient and thus charging is not required any more, the user can conveniently perform continuous phone communication by automatically switching the operation mode again to a handset mode while at the same time suspending the charging of the electronic device 200.

Figure 20:
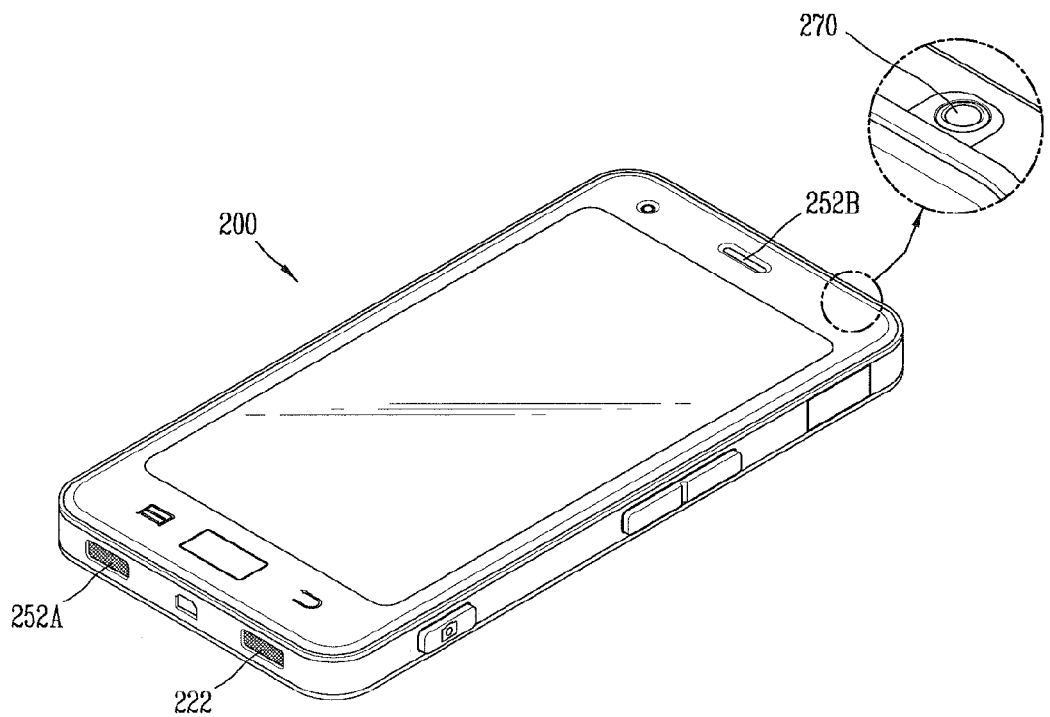
FIG. 20 is a conceptual view illustrating the electronic device according to a second embodiment disclosed herein.

FIG. 20 is a conceptual view illustrating the electronic device 200 according to a second embodiment disclosed herein.

While reproducing content using the electronic device 200, the electronic device 200 can be operated in a headphone mode or speaker mode. When content reproduction is started in the electronic device 200, the electronic device 200 can be set to a default mode. For example, the electronic device 200 can be configured to first determine whether or not a headphone is connected for all content reproductions, thereby allowing the electronic device 200 to be operated in a headphone mode when the headphone is connected and operated in a speaker mode when the headphone is not connected. Otherwise, the electronic device 200 can be configured to be operated in the previous operation mode for all content reproductions. Otherwise, the operation mode of the electronic device 200 can be set by allowing the user to manually select an operation mode prior to or during the content reproduction. Based on the configuration of the output mode, the controller 280 can output an audio signal based on the reproduction of the content stored in the memory 260 to a headphone connected to the speaker 252A or interface unit 270.

The reproduction of the content in a headphone mode uses a headphone connected to the interface unit 270. Because the headphone is located in closer proximity to the user's ear while using the handset speaker 252B, the speaker 252A outputs an audio signal in a higher volume than the headphone.

While reproducing content using the electronic device 200, the user's voice can be input through a microphone 222. The user's voice can be input through the microphone 222 in both a speaker mode and a headphone mode. However, otherwise, a speaker mode microphone and a headphone mode microphone can be implemented in a different way from each other. For example, the microphone 222 can be a speaker mode microphone, and a headphone mode microphone can be additionally provided in the headphone.

The electronic device 200 receives a wireless power signal from the wireless power transmitter 100, and detects the wireless power transmitter 100 located in the charging region 700 using the received wireless power signal. When the wireless power transmitter 100 is detected, the electronic device 200 checks whether the operation mode of the electronic device 200 is a speaker mode, and switches the operation mode of the electronic device 200 to a speaker mode when it is not in a speaker mode (for example, a headphone mode). Then, when the wireless power transmitter 100 is not detected, the electronic device 200 switches the operation mode of the electronic device 200 to a headphone mode again.

Figure 21:
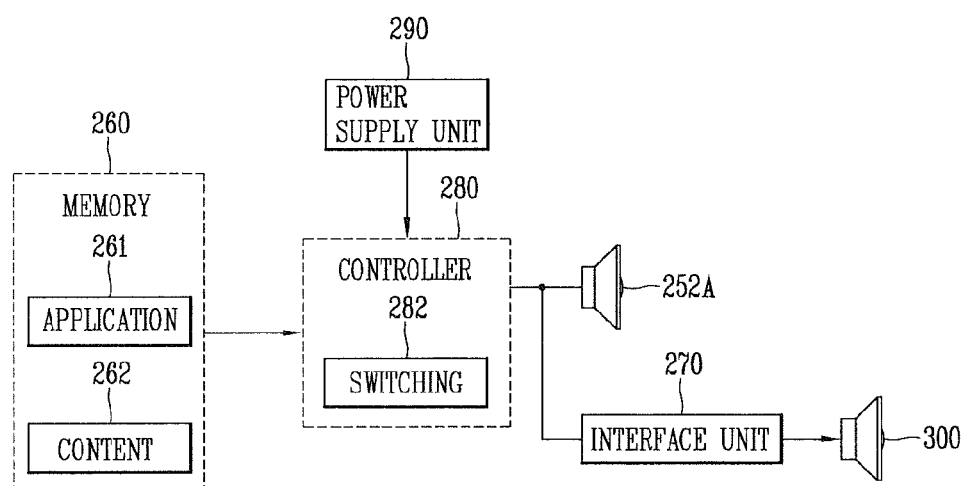
FIG. 21 is a block diagram illustrating the electronic device having a switching function of the output mode in a wireless power transmitting and receiving environment according to a second embodiment disclosed herein.

FIG. 21 is a block diagram illustrating the electronic device 200 having a switching function of the output mode in a wireless power transmitting and receiving environment according to a second embodiment disclosed herein.

The memory 260 can store an application 261 and content data 262 used for content reproduction. The controller 280 can execute the application 261 and reproduce the content data 262 through the application 261 according to the user's input in the electronic device 200. The controller 280 decodes the content data 262 to output an audio signal to the speaker 252A or output the audio signal to a head phone 300 connected to the interface unit 270.

As described above, the controller 280 outputs an audio signal corresponding to the content data 262 to the speaker 252A in a speaker mode, and the controller 280 outputs an audio signal corresponding to the content data 262 to the headphone in a wired or wireless manner connected to the interface unit 270 in a headphone mode. For this purpose, the controller 280 can include a switching unit 282 for outputting an audio signal corresponding to the content data 262 to the speaker 252C or headphone 300 according to the output mode.

While reproducing content in a headphone mode in which an audio signal corresponding to the content data 262 is output through the headphone 300 (the interface unit 270 transmits the audio signal corresponding to the content data 262 to the headphone 300), the power receiving unit 291 receives a wireless power signal from the wireless power transmitter 100. Then, the controller 280 detects the wireless power transmitter 100 located in the charging region 700 using the wireless power signal, and switches the operation mode of the electronic device 200 to a speaker mode in which an audio signal corresponding to the content data 262 is output through the speaker 252A when the wireless power transmitter 100 is detected (the interface unit 270 suspends a transmission of the audio signal corresponding to the content data 262 to the headphone). The display unit 251 can display an indicator reflecting the operation mode of the electronic device 200. The operation mode of the electronic device 200 can indicate an active state of the speaker 252A.

While reproducing content in a speaker mode in which an audio signal corresponding to the content data 262 stored in the memory 260 is output through the speaker 252A as described above, the power receiving unit 291 can continuously receive a wireless power signal from the wireless power transmitter 100. Then, the controller 280 determines whether the wireless power transmitter 100 located in the charging region 700 is detected in a predetermined period, and switches the operation mode of the electronic device 200 again to a headphone mode in which an audio signal corresponding to the content data 262 is output through the headphone 300 connected to the interface unit 270 when the wireless power transmitter 100 is not detected any more. Furthermore, the display unit 251 can display an indicator reflecting the operation mode of the electronic device 200. The operation mode of the electronic device 200 can indicate an active state of the headphone 300.

Accordingly, when the power of the electronic device 200 is insufficient and thus charging is required while reproducing content data in a headphone mode, the user can continuously listen an audio signal corresponding to the content in a convenient way by automatically switching the operation mode to a speaker mode while at the same time charging the electronic device 200 using the wireless power transmitter 100. Furthermore, when the power of the electronic device 200 is sufficient and thus charging is not required any more, the user can conveniently listen an audio signal corresponding to the content in a convenient way by automatically switching the output mode again to a headphone mode while at the same time suspending the charging of the electronic device 200.

Figure 22:
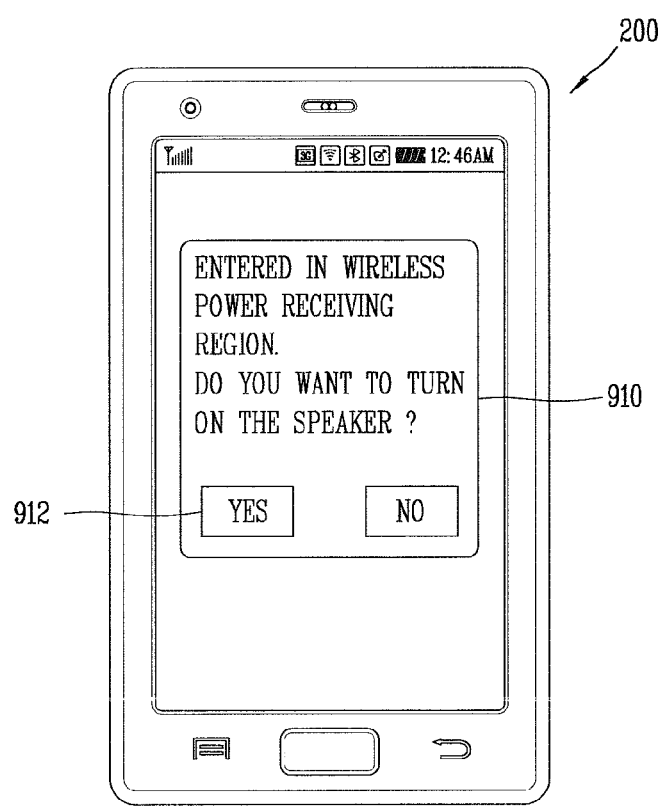
FIG. 22 is a conceptual view illustrating a user interface provided during mode switching in the electronic device according to a first and a second embodiment disclosed herein.

FIG. 22 is a conceptual view illustrating a user interface provided during mode switching in the electronic device 200 according to a first and a second embodiment disclosed herein.

As described above, when the controller 280 detects the wireless power transmitter 100 located in the charging region 700, the controller 280 determines whether the operation of the audio output module 252A is in an active state, and the display unit 251 displays a guide message 910 including a menu 912 for activating the operation of the audio output module 252A when it is not in an active mode. Then, the user input unit 230 receives an input for selecting a menu 912 displayed by the display unit 251, and activates the operation of the audio output module 252A when the input is received.

Figure 23:
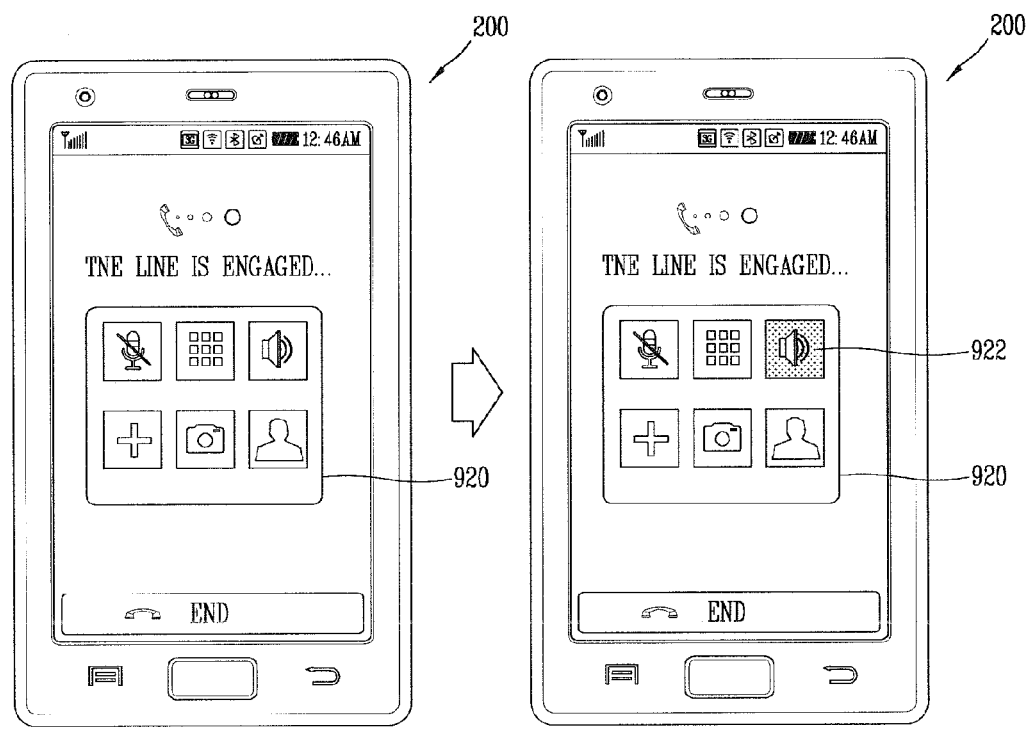
FIG. 23 is a conceptual view illustrating a user interface provided during mode switching in the electronic device according to a first embodiment disclosed herein.

FIG. 23 is a conceptual view illustrating a user interface provided during mode switching in the electronic device 200 according to a first embodiment disclosed herein.

While having a conversation over the phone, the display unit 251 can display menus 920 that can be carried out by the controller 280. For example, the menus 920 can include a mute menu for not transmitting voice generated from the user of the electronic device 200, a keypad menu displaying a keypad, a phone-call mode menu displaying a phone-call mode, a call participant addition menu allowing another user's terminal to participate in a phone conversation, a video call menu for switching from a voice call to a video call, a contact address menu displaying a contact address list stored in the memory 260, and the like.

As described above, when the controller 280 detects the wireless power transmitter 100 located in the charging region 700, the controller 280 switches the operation mode of the electronic device 200 from a handset mode to a speakerphone mode. Accordingly, the phone call mode of the electronic device 200 is switched from a handset mode to a speakerphone mode, and the display unit 251 can display an indicator 922 indicating that the phone call mode is in a speakerphone mode.

Figure 24:
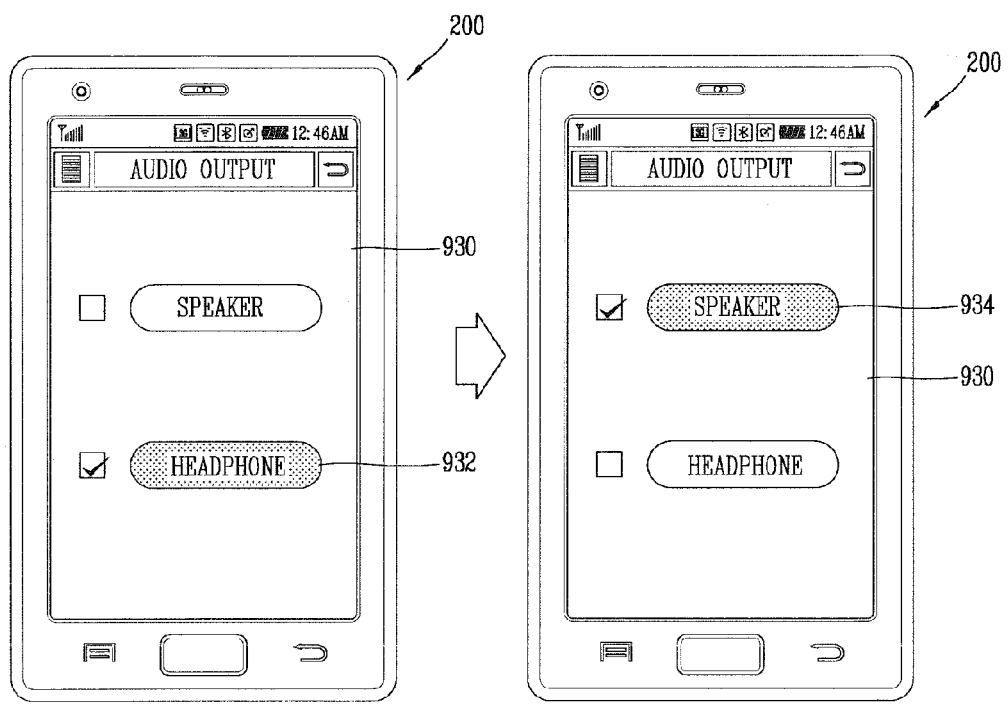
FIG. 24 is a conceptual view illustrating a user interface provided during mode switching in the electronic device according to a second embodiment disclosed herein.

FIG. 24 is a conceptual view illustrating a user interface provided during mode switching in the electronic device 200 according to a second embodiment disclosed herein.

While reproducing content, the display unit 251 can display a menu 930 indicating an output target of the audio signal. In a headphone mode, the display unit 251 can display an indicator 932 indicating that the output mode is in a headphone mode. As described above, when the controller 280 detects the wireless power transmitter 100 located in the charging region 700, the controller 280 switches the operation mode of the electronic device 200 from a headphone mode to a speaker mode. Accordingly, the output mode of the electronic device 200 can be switched from a headphone mode to a speaker mode, and the display unit 251 can display an indicator 934 indicating that the output mode is in a speaker mode.

According to a wireless power transmitter and wireless power receiver disclosed herein, when the user places the wireless power receiver over a charging region while having a conversation on the phone in a handset mode, the phone-call mode is automatically switched to a speakerphone mode, thereby providing an advantage of capable of maintaining the continuity of communication.

Furthermore, according to a wireless power transmitter and wireless power receiver disclosed herein, when the user places the wireless power receiver over a charging region while listening content in a headphone mode, the output mode is automatically switched to a speaker mode, thereby providing an advantage of capable of maintaining the continuity of content listening.

As a result, the user can get out of the limitation of the arrangement state of the wireless power receiver for wireless charging, and particularly, such a mode switching can be automatically carried out, thereby allowing the user not to feel inconvenience due to termination of the phone call or content reproduction.

The foregoing method can be implemented in a recording medium readable by a computer or its similar devices by employing, for example, software, hardware or some combinations thereof.

For a hardware implementation, the embodiments described herein can be implemented by using at least any one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein. For example, the foregoing methods can be implemented by the controller 120 of the charger 100, or the foregoing methods can be implemented by the controller 281 of the mobile terminal 200 or multimedia device 200.

For a software implementation, the embodiments such as procedures and functions disclosed herein can be implemented with separate software modules. Each of the software modules can perform one or more of the functions and operations described herein. Software codes can be implemented by using a software application written in a suitable programming language. The software codes can be stored in the memory 260, and implemented by the controller 280.

The scope of the invention will not be limited to the embodiments disclosed herein, and thus various modifications, variations, and improvements can be made in the present invention without departing from the spirit of the invention, and within the scope of the appended claims.

What is claimed is:

1. A wireless power receiver, comprising:
a first audio output module;
a power receiving unit configured to receive a wireless power signal; and
a control unit configured to detect a wireless power transmitter located in a charging region associated with the wireless power signal using the wireless power signal, and change the operation of the first audio output module from a deactivated state to an activated state when the wireless power transmitter is detected,
wherein the control unit is further configured to change an operation of the first audio output module from a deactivated state to an activated state before connection or contact between the wireless power receiver and the wireless power transmitter.

2. The wireless power receiver of claim 1, further comprising:
a second audio output module,
wherein the control unit changes the operation of the second audio output module from an activated state to a deactivated state when the operation of the first audio output module is activated.

3. The wireless power receiver of claim 2, wherein the first audio output module is a speakerphone speaker, and
wherein the second audio output module is a handset speaker or a headphone speaker.

4. The wireless power receiver of claim 1, wherein the control unit switches the operation mode of the wireless power receiver from a handset mode to a speakerphone mode when the wireless power transmitter is detected.

5. The wireless power receiver of claim 1, further comprising:
an interface unit configured to transmit an audio signal to an audio output device connected thereto,
wherein the control unit suspends a transmission of the audio signal when the operation of the first audio output module is activated.

6. The wireless power receiver of claim 1, wherein the control unit deactivates the operation of the first audio output module when the wireless power transmitter is not detected.

7. The wireless power receiver of claim 6, wherein the control unit switches the operation mode of the wireless power receiver from a speakerphone mode to a handset mode when the wireless power transmitter is not detected.

8. The wireless power receiver of claim 1, wherein the power receiving unit detects the wireless power transmitter based on a strength of the wireless power signal.

9. The wireless power receiver of claim 1, wherein the power receiving unit receives power in a wireless manner from the wireless power transmitter when the wireless power transmitter is detected.

10. The wireless power receiver of claim 1, further comprising:
a display unit configured to output a menu for activating the operation of the first audio output module; and
an input unit configured to receive an input for selecting a menu to activate the operation of the first audio output module,
wherein the control unit activates the operation of the first audio output module upon receiving the input.

11. The wireless power receiver of claim 1, further comprising:
an output configured to output an indicator indicating an active state of the operation of the first audio output module.

12. The wireless power receiver of claim 1, wherein the control unit is configured to ignore a signal to change the operation of the first audio output module when the first audio output module is in an activated state.

13. The wireless power receiver of claim 1, wherein the control unit is further configured to change the operation of the first audio output module before the wireless power transmitter is capable of transmitting power.

14. The wireless power receiver of claim 1, wherein the control unit is further configured to ignore detection of a wireless power transmitter when the first audio output is activated.

15. A wireless charging apparatus, comprising:
a wireless power transmitter configured to transmit a wireless power signal, the wireless power signal forming a charging region; and
a wireless power receiver having a first audio output module and a second audio output module, the wireless power receiver configured to receive wireless power signal from the wireless power transmitter and perform a charging operation according to the received wireless power signal,
wherein the wireless power transmitter is further configured to detect the wireless power receiver located in the charging region and output a first control signal for changing an audio output path to the wireless power receiver, the first control signal being included in the wireless power signal, and
wherein the wireless power receiver is further configured to change the audio output path from the second audio output module to the first audio output module based on the received first control signal,
wherein the wireless power transmitter is further configured to output a second control signal for changing an audio output path to the wireless power receiver when the wireless power transmitter is not detected, the second control si~,nal bein~ included in the wireless power signal, and
wherein the wireless power receiver is further configured to change the audio output path from the first audio output module to the second audio output module based on the received second control signal.

16. The wireless charging apparatus of claim 15, wherein the first audio output module is a speakerphone speaker, and
wherein the second audio output module is a handset speaker or a headphone speaker.

17. The wireless charging apparatus of claim 15, wherein the wireless power receiver switches the operation mode of the wireless power receiver from a handset mode to a speakerphone mode according to the first control signal.

18. The wireless charging apparatus of claim 15, wherein the wireless power receiver comprises:
a control unit configured to control changing the audio output path of the wireless power transmitter based on the control signal included in the received wireless power signal; and
an interface unit configured to transmit an audio signal to an audio output device connected thereto,
wherein the control unit is further configured to:
decode the received wireless power signal and check whether the operation of the first audio output module is in active state according to the control included in the received wireless power signal; and
activate the operation of the first audio output module when the first audio output module is not in an active state and deactivate the operation of the second audio output module.

19. The wireless charging apparatus of claim 18, wherein the wireless power receiver further comprises:
a display unit configured to output a menu for activating the operation of the first audio output module; and
an input unit configured to receive an input for selecting a menu to activate the operation of the first audio output module,
wherein the control unit activates the operation of the first audio output module upon receiving the input.

20. The wireless charging apparatus of claim 18, wherein the wireless power receiver further comprises an output configured to output an indicator indicating an active state of the operation of the first audio output module.

21. The wireless charging apparatus of claim 18, wherein the control unit is configured to ignore a signal to change the operation of the first audio output module when the first audio output module is in an activated state.

* * * * *